United States Patent
Christensen et al.

(10) Patent No.: US 11,022,061 B1
(45) Date of Patent: Jun. 1, 2021

(54) SYSTEMS AND METHODS FOR AN EXHAUST GAS TEMPERATURE SENSOR DIAGNOSTICS USING SPLIT LAMBDA ENGINE OPERATION

(71) Applicant: Ford Global Technologies, LLC, Dearborn, MI (US)

(72) Inventors: Michael Scott Christensen, Canton, MI (US); Michael Bastanipour, Ferndale, MI (US); Douglas Raymond Martin, Canton, MI (US); Adam Joseph Krach, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/778,124

(22) Filed: Jan. 31, 2020

(51) Int. Cl.
| | |
|---|---|
| *F02D 41/22* | (2006.01) |
| *F02D 41/04* | (2006.01) |
| *F02P 5/14* | (2006.01) |
| *F02D 41/14* | (2006.01) |
| *F02D 41/30* | (2006.01) |

(52) U.S. Cl.
CPC ........... *F02D 41/222* (2013.01); *F02D 41/04* (2013.01); *F02D 41/1454* (2013.01); *F02D 41/3005* (2013.01); *F02P 5/14* (2013.01); F02D 2200/08 (2013.01)

(58) Field of Classification Search
CPC .... F02D 41/222; F02D 41/04; F02D 41/3005; F02D 41/1454; F02D 2200/08; F02P 5/14
See application file for complete search history.

(56) References Cited

U.S. PATENT DOCUMENTS

| | | | |
|---|---|---|---|
| 7,356,988 B2 | 4/2008 | Pott et al. | |
| 7,975,471 B2 | 7/2011 | Miyashita | |
| 8,112,218 B2 | 2/2012 | Russ | |
| 9,074,513 B2 | 7/2015 | Makki et al. | |
| 2003/0097873 A1* | 5/2003 | Surnilla | F02D 41/222 73/114.74 |
| 2005/0102076 A1* | 5/2005 | Kariya | F02D 41/222 701/30.2 |
| 2008/0307851 A1* | 12/2008 | Smith | F02D 41/221 73/1.06 |

* cited by examiner

*Primary Examiner* — Xiao En Mo
(74) *Attorney, Agent, or Firm* — Geoffrey Brumbaugh; McCoy Russell LLP

(57) ABSTRACT

Methods and systems are provided for identifying degraded exhaust gas temperature (EGT) sensor responses. In one example, a method may include cycling an engine between a higher temperature operating mode and a lower temperature operating mode while maintaining engine torque output across the higher temperature operating mode and the lower temperature operating modes, both the higher temperature operating mode and the lower temperature operating mode providing stoichiometric exhaust gas to a downstream catalyst, and characterizing a response behavior of an EGT sensor based on output of the EGT sensor during the cycling. In this way, stepwise exhaust gas temperature changes are produced for characterizing the EGT sensor response without disrupting emissions and torque control.

20 Claims, 7 Drawing Sheets

SYSTEMS AND METHODS FOR AN EXHAUST GAS TEMPERATURE SENSOR DIAGNOSTICS USING SPLIT LAMBDA ENGINE OPERATION

FIELD

The present description relates generally to systems and methods for monitoring an exhaust gas temperature sensor.

BACKGROUND/SUMMARY

An exhaust gas temperature (EGT) sensor may be positioned in an exhaust system of a vehicle to measure a temperature of exhaust gas produced by an internal combustion engine of the vehicle. Output of the EGT sensor may be used by a vehicle controller to adjust engine operation. For example, an ignition spark timing may be adjusted based on the measured exhaust gas temperature. As such, degradation of the EGT sensor may degrade engine control, which may lead to increased vehicle emissions and/or decreased fuel efficiency.

Previous approaches to monitoring the EGT sensor have relied on comparing sensor output to a reference value expected at certain engine operating conditions, for example. This may allow the vehicle controller to detect an EGT sensor offset (e.g., the EGT sensor consistently reads at a higher or lower temperature) or other major faults. For example, the EGT sensor may consistently report values that are higher than expected values by a constant amount. As another example, the EGT sensor may cease to function entirely, outputting no data. Such degradation behaviors can be detected during steady-state sensor operation, as they do not depend on measuring how the EGT sensor responds to temperature changes over time. However, because the exhaust gas temperature may be used as an input in engine control operations that may themselves change the exhaust gas temperature, such as spark timing and fueling strategies, the aforementioned steady-state approaches to monitoring the EGT sensor may provide insufficient information for fully characterizing EGT sensor functionality.

Thus, the inventors herein have advantageously recognized the importance of transient degradation behavior in EGT sensors. Transient EGT sensor degradation may refer to the difference between the transient EGT sensor response to a stepwise change in temperature and an expected sensor response. In particular, the inventors herein have recognized that an EGT sensor may exhibit several discrete types of transient degradation behavior. These transient degradation behavior types may be categorized as delay degradation (e.g., the sensor response lags behind the expected response) or slew rate degradation (e.g., the sensor response rate is lower than the expected response rate). Further, these degradation behavior types may occur symmetrically or asymmetrically with respect to a change in temperature. For example, a sensor may display asymmetric type degradation (e.g., hot-to-cold asymmetric delay, cold-to-hot asymmetric delay, etc.) that affects either cold-to-hot or hot-to-cold EGT sensor responses, or symmetric type degradation (e.g., symmetric delay) that affects both cold-to-hot and hot-to-cold EGT sensor responses. These transient degradation behaviors may affect engine performance when EGT sensor data is used for time-dependent vehicle control strategies. As elaborated above, previous approaches to EGT sensor monitoring do not detect these types of transient degradation.

The inventors herein have recognized the above issues and have developed a method to at least partially address them. In one example, a method comprises: cycling an engine between a high temperature operating mode and a low temperature operating mode while maintaining engine torque between the high temperature operating mode and the low temperature operating mode, both the high temperature operating mode and the low temperature operating mode producing stoichiometric exhaust gas at a catalyst; and characterizing a response behavior of an exhaust gas temperature (EGT) sensor based on output of the EGT sensor during the cycling. In this way, degraded EGT sensor responses during transient temperature conditions may be identified and characterized, thereby increasing an accuracy of the engine control strategies that utilize exhaust gas temperature as an input.

As one example, cycling the engine between the high temperature (e.g., hotter) operating mode and the low temperature (e.g., colder) operating mode includes transitioning the engine from the high temperature operating mode to the low temperature operating mode and transitioning the engine from the low temperature operating mode to the high temperature operating mode at a determined frequency and for a determined number of transitions. For example, the engine may operate in the high temperature operating mode for a first duration, transition to the low temperature operating mode and operate in the low temperature operating mode for a second duration immediately following the first duration, transition back to the high temperature operating mode, and repeat the process until a desired number of transitions occur.

As an example, the high temperature operating mode may include operating every cylinder of the engine with stoichiometric fueling and a same first retarded spark timing, and the low temperature operating mode may include operating a first subset of the cylinders with rich fueling and a second retarded spark timing that is less retarded than the first retarded spark timing and a second, remaining subset of the cylinders with lean fueling and a third retarded spark timing that is less retarded than the second retarded spark timing. Thus, the engine may be transitioned between operating uniformly at stoichiometry a uniform retarded spark timing to operating different cylinder groups with different air-fuel ratios and different, further advanced spark timings (compared with the uniform retarded spark timing). In particular, the second retarded spark timing and the third retarded spark timing may selected to balance torque output not only between the first, rich subset of the engine cylinders with the second, lean subset of the engine cylinders, but to also maintain engine torque output between the high temperature operating mode and the low temperature operating mode. Further, a number of cylinders in the first subset may be equal to a number of cylinders in the second subset such that a degree of enrichment of the rich fueling is equal to a degree of enleanment of the lean fueling in order to maintain an average exhaust gas air-fuel ratio at stoichiometry.

As another example, the EGT sensor response behavior may include at least one of asymmetric delay degradation behavior, symmetric delay degradation behavior, asymmetric slew rate degradation behavior, symmetric slew rate degradation behavior, and no degradation behavior. As one example, a first time delay between transitioning the engine from the high temperature operating mode to the low temperature operating mode and the output of the EGT sensor decreasing and a second time delay between transitioning the engine from the low temperature operating mode to the high temperature operating mode and the output of the EGT sensor increasing may each be determined. Symmetric delay degradation behavior may be indicated responsive to both of the first time delay and the second time delay being greater than a threshold delay, and asymmetric slew rate degradation behavior may be indicated responsive to only one of the first time delay and the second time delay being greater than the threshold delay. As another example, a first slew rate may be determined based on a change in the output of the EGT sensor over time after transitioning the engine from the high temperature operating mode to the low temperature operating mode, and a second slew rate may be determined based on the change in the output of the EGT sensor over time after transitioning the engine from the low temperature operating mode to the high temperature operating mode. Symmetric slew rate degradation behavior may be indicated responsive to both of the first slew rate and the second slew rate being less than a threshold slew rate, and asymmetric slew rate degradation behavior may be indicated responsive to only one of the first slew rate and the second slew rate being less than the threshold slew rate. As another example, no degradation behavior may be indicated responsive to none of the symmetric delay degradation behavior, asymmetric delay degradation behavior, symmetric slew rate degradation behavior, and asymmetric slew rate degradation behavior being indicated.

In this way, stepwise changes in exhaust gas temperature may be produced without degrading emissions control (e.g., via global enrichment for decreasing the exhaust gas temperature) and without producing torque fluctuations (e.g., via global spark retard and advancement). As a result, vehicle emissions may be decreased while engine noise, vibration, and harshness are decreased. Further, the stepwise changes in the exhaust gas temperature enable the transient EGT sensor behavior to be evaluated in order to identify delayed and slowed responses that may not be identified by comparing sensor output to a reference value.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
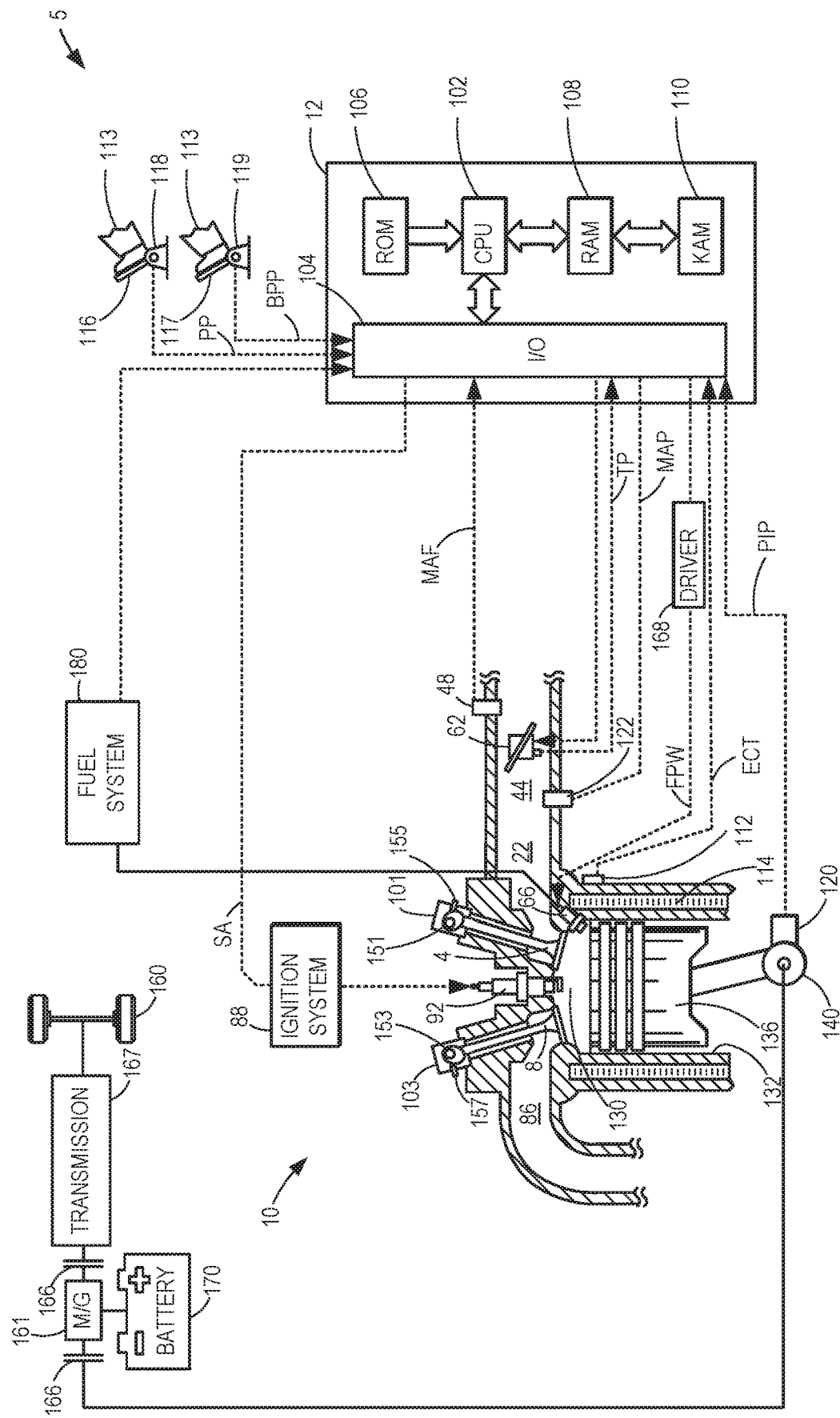
FIG. 1 shows an embodiment of a cylinder that may be included in an engine system.
Figure 11:
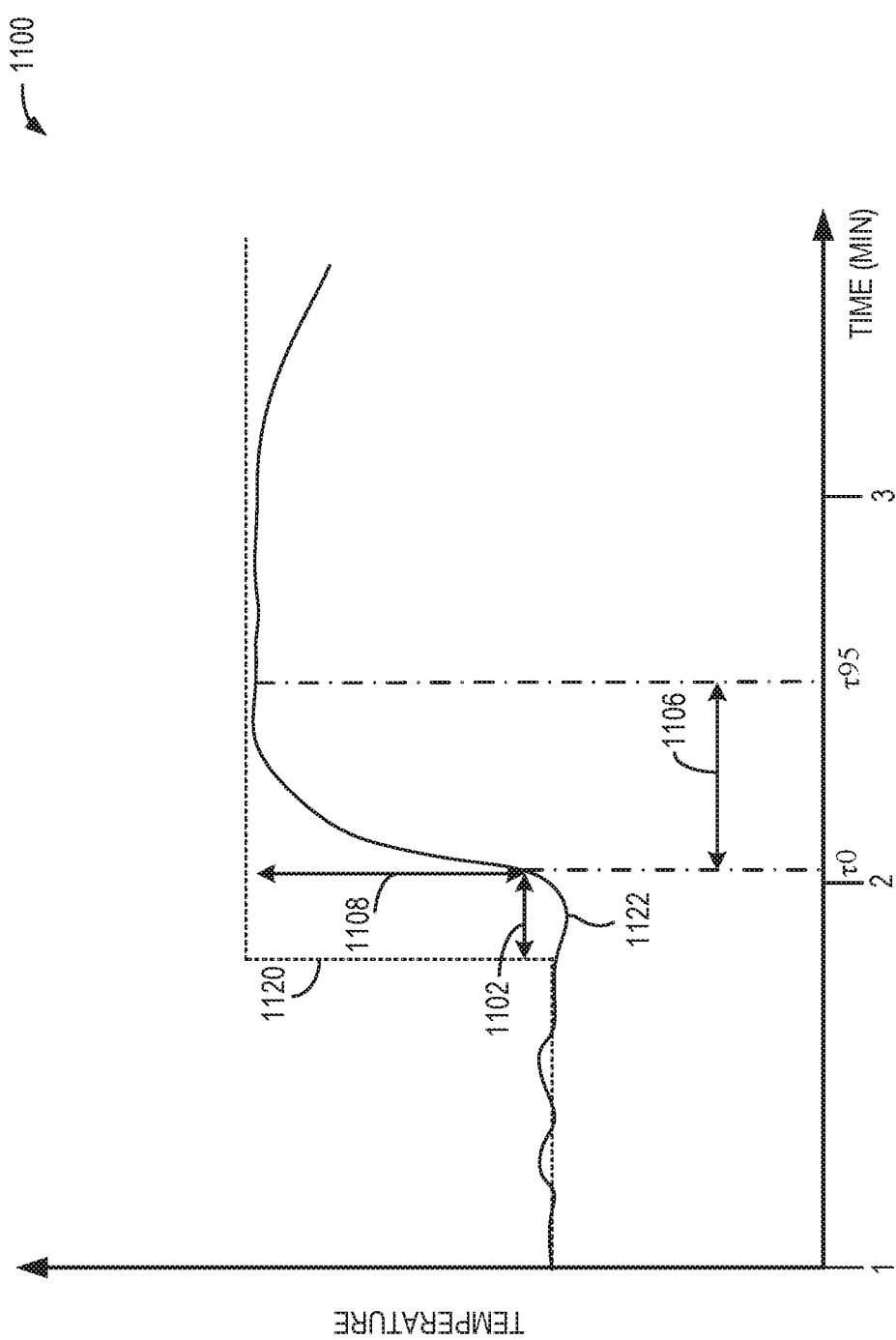
FIG. 11 shows a graph illustrating an exhaust gas sensor response during a stepwise change from high temperature operation to low temperature operation.
Figure 12:
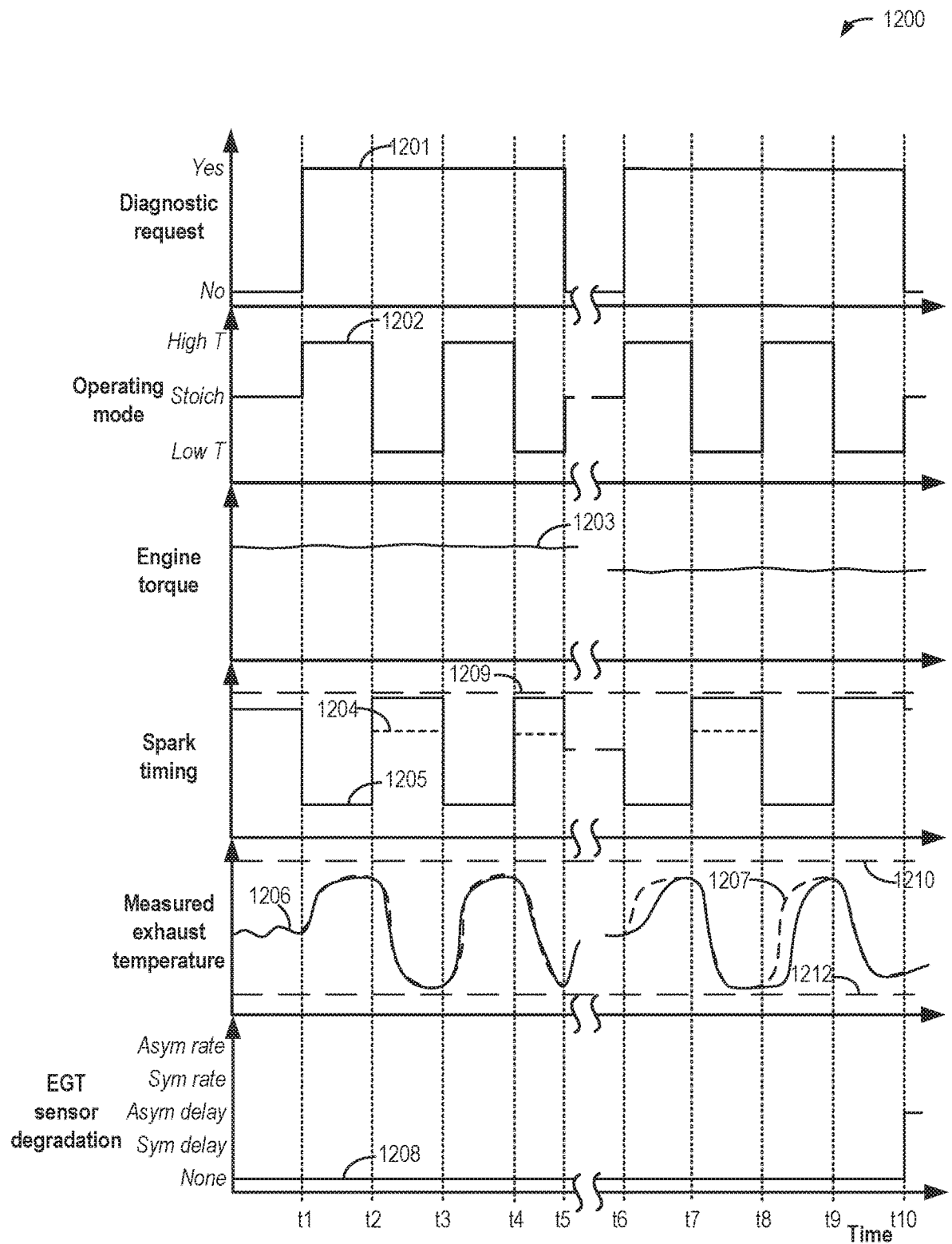
FIG. 12 shows a prophetic example timeline showing adjustments to cylinder air-fuel ratios and spark timing for diagnosing an exhaust gas temperature sensor.

The following description relates to systems and methods for characterizing and diagnosing an exhaust gas temperature sensor of an engine system. The engine system may include various multi-cylinder configurations, such as the example engine system configuration shown in FIG. 2, and each cylinder of the engine may have a cylinder configuration, such as shown in FIG. 1. A controller may adjust engine fueling and spark timing for exhaust gas temperature sensor diagnostics while maintaining the engine torque output via the example method of FIG. 3 and analyze the exhaust gas temperature sensor output according to the example method of FIG. 4 to indicate a presence or absence of exhaust gas temperature sensor degradation. Specifically, the controller may transition the engine between high temperature and low temperature operation via a split lambda fueling strategy in combination with spark timing adjustments. As will be elaborated herein, the split lambda fueling strategy includes operating a first number of engine cylinders with a rich air-fuel ratio (e.g., lambda value) and a second number of engine cylinders with a lean air-fuel ratio while maintaining stoichiometry at a downstream catalyst. As also elaborated herein, cycling between the split lambda fueling and stoichiometric fueling with retarded spark timing produces stepwise changes in exhaust gas temperature while maintaining constant brake torque between the split lambda and the stoichiometric operation via differential spark timing adjustments. FIGS. 5-10 show example graphs of six different potential degradation behaviors of the exhaust gas temperature sensor, including degraded slew rates and sensor delays, that may be differentiated based on the sensor output during the cycling. FIG. 11 illustrates an example exhaust gas temperature sensor reading in response to a stepwise change in temperature. A prophetic example timeline illustrating transitioning between high temperature and low temperature operation, including adjustments to cylinder air-fuel ratio splits and cylinder spark timing, based on a request for sensor diagnostics, is shown in FIG. 12. In this way, the response of an exhaust gas temperature sensor may be monitored and characterized while maintaining constant brake torque and global stoichiometric operation.

Turning now to the figures, FIG. 1 shows a partial view of a single cylinder 130 of an internal combustion engine 10 that may be included in a vehicle 5. Internal combustion engine 10 may be a multi-cylinder engine, one example configuration of which will be described below with respect to FIG. 2. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust port 86 via exhaust valve 8.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate exhaust valve 8 such that it remains closed and does not open at its set timing. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. While FIG. 1 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed. Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to a throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, the intake/exhaust valves and cams, etc. The controller may receive input data from the various sensors, process the input data, and trigger the actuators in response to the processed input data based on instruction or code programmed therein corresponding to one or more routines, examples of which is described with respect to FIGS. 3 and 4.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Figure 2:
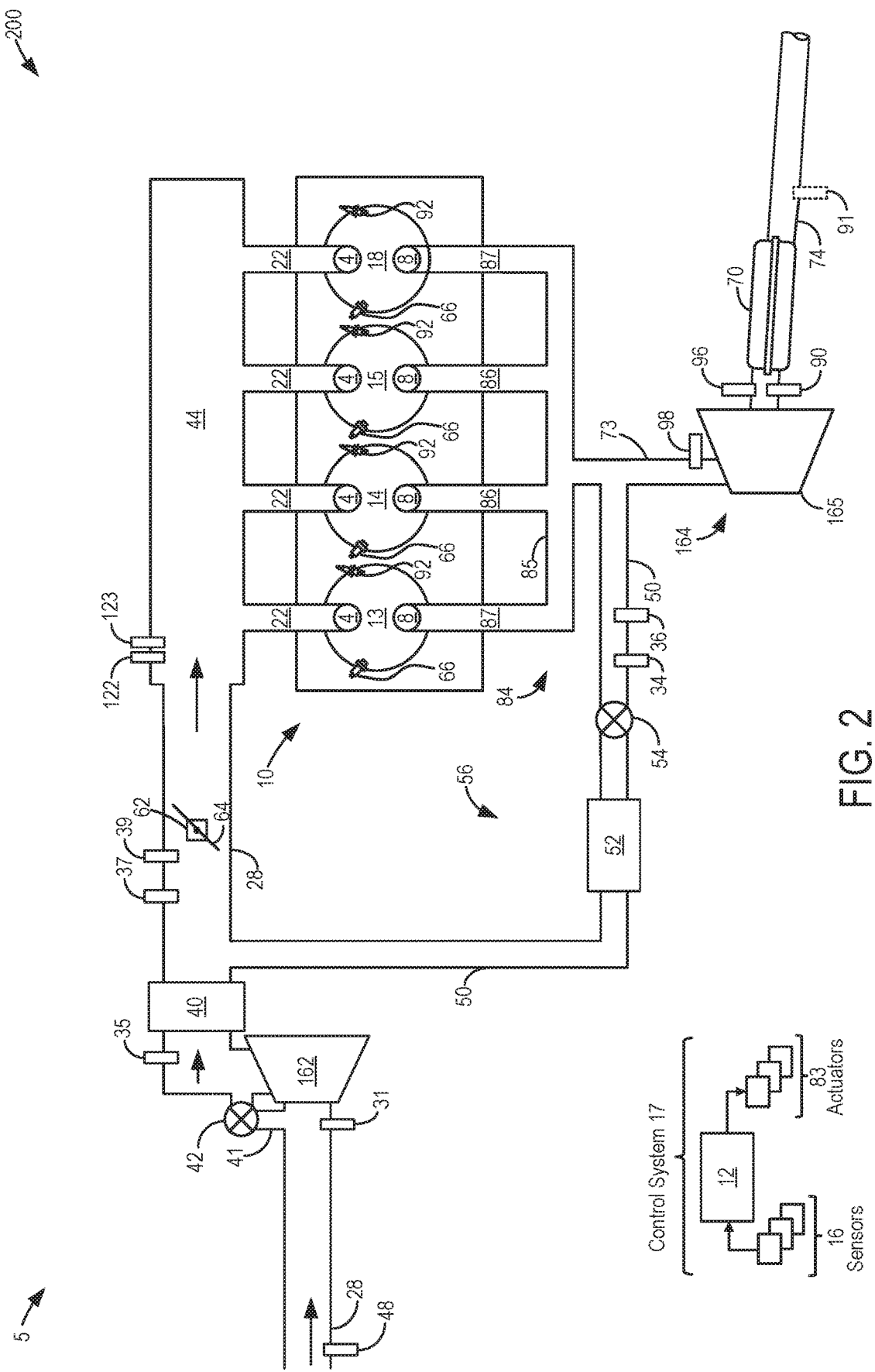
FIG. 2 shows a schematic depiction of an example of an engine system.

As mentioned above, FIG. 1 shows one cylinder of multi-cylinder engine 10. Referring now to FIG. 2, a schematic diagram of an example engine system 200 is shown, which may be included in the propulsion system of vehicle 5 of FIG. 1. For example, engine system 200 provides one example engine configuration of engine 10 introduced in FIG. 1. As such, components previously introduced in FIG. 1 are represented with the same reference numbers and are not re-introduced. In the example shown in FIG. 2, engine 10 includes cylinders 13, 14, 15, and 18, arranged in an inline-4 configuration, although other engine configurations are also possible (e.g., I-3, V-4, I-6, V-8, V-12, opposed 4, and other engine types). Thus, the number of cylinders and the arrangement of the cylinders may be changed without parting from the scope of this disclosure. The engine cylinders may be capped on the top by a cylinder head. Cylinders 14 and 15 are referred to herein as the inner (or inside) cylinders, and cylinders 13 and 18 are referred to herein as the outer (or outside) cylinders. The cylinders shown in FIG. 2 may each have a cylinder configuration, such as the cylinder configuration described above with respect to FIG. 1.

Each of cylinders 13, 14, 15, and 18 includes at least one intake valve 4 and at least one exhaust valve 8. The intake and exhaust valves may be referred to herein as cylinder intake valves and cylinder exhaust valves, respectively. As explained above with reference to FIG. 1, a timing (e.g., opening timing, closing timing, opening duration, etc.) of each intake valve 4 and each exhaust valve 8 may be controlled via various valve timing systems.

Each cylinder receives intake air (or a mixture of intake air and recirculated exhaust gas, as will be elaborated below) from intake manifold 44 via an air intake passage 28. Intake manifold 44 is coupled to the cylinders via intake ports (e.g., runners) 22. In this way, each cylinder intake port can selectively communicate with the cylinder it is coupled to via a corresponding intake valve 4. Each intake port may supply air, recirculated exhaust gas, and/or fuel to the cylinder it is coupled to for combustion.

As described above with respect to FIG. 1, a high pressure fuel system may be used to generate fuel pressures at the fuel injector 66 coupled to each cylinder. For example, controller 12 may inject fuel into each cylinder at a different timing such that fuel is delivered to each cylinder at an appropriate time in an engine cycle. As used herein, "engine cycle" refers to a period during which each engine cylinder fires once in a designated cylinder firing order. A distributorless ignition system may provide an ignition spark to cylinders 13, 14, 15, and 18 via the corresponding spark plug 92 in response to the signal SA from controller 12 to initiate combustion. A timing of the ignition spark may be individually adjusted for each cylinder or for a group of cylinders, as will be further described below with respect to FIG. 3.

Inside cylinders 14 and 15 are each coupled to an exhaust port (e.g., runner) 86 and outside cylinders 13 and 18 are each coupled to an exhaust port 87 for channeling combustion exhaust gases to an exhaust system 84. Each exhaust port 86 and 87 can selectively communicate with the cylinder it is coupled to via the corresponding exhaust valve 8. Specifically, as shown in FIG. 2, cylinders 14 and 15 channel exhaust gases to an exhaust manifold 85 via exhaust ports 86, and cylinders 13 and 18 channel exhaust gases to the exhaust manifold 85 via exhaust ports 87. Thus, engine system 200 includes a single exhaust manifold that is coupled to every cylinder of the engine Engine system 200 further includes a turbocharger 164, including a turbine 165 and an intake compressor 162 coupled on a common shaft (not shown). In the example shown in FIG. 2, turbine 165 is fluidically coupled to exhaust manifold 85 via a first exhaust passage 73. Turbine 165 may be a monoscroll turbine or a dual scroll turbine, for example. Rotation of turbine 165 drives rotation of compressor 162, disposed within intake passage 28. As such, the intake air becomes boosted (e.g., pressurized) at the compressor 162 and travels downstream to intake manifold 44. Exhaust gases exit turbine 165 into a second exhaust passage 74. In some examples, a wastegate may be coupled across turbine 165 (not shown). Specifically, a wastegate valve may be included in a bypass coupled between exhaust passage 73, upstream of an inlet of turbine 165, and exhaust passage 74, downstream of an outlet of turbine 165. The wastegate valve may control an amount of exhaust gas flowing through the bypass and to the outlet of turbine. For example, as an opening of the wastegate valve increases, an amount of exhaust gas flowing through the bypass and not through turbine 165 may increase, thereby decreasing an amount of power available for driving turbine 165 and compressor 162. As another example, as the opening of the wastegate valve decreases, the amount of exhaust gas flowing through the bypass decreases, thereby increasing the amount of power available for driving turbine 165 and compressor 162. In this way, a position of the wastegate valve may control an amount of boost provided by turbocharger 164. In other examples, turbine 165 may be a variable geometry turbine (VGT) including adjustable vanes to change an effective aspect ratio of turbine 165 as engine operating conditions change to provide a desired boost pressure. Thus, increasing the speed of turbocharger 164, such as by further closing the wastegate valve or adjusting turbine vanes, may increase the amount of boost provided, and decreasing the speed of turbocharger 164, such as by further opening the wastegate valve or adjusting the turbine vanes, may decrease the amount of boost provided.

Exhaust passage 73 further includes an exhaust gas temperature (EGT) sensor 98. In the example shown in FIG. 2, EGT sensor 98 is located upstream of turbine 165, such as near the inlet of turbine 165. As such, EGT sensor 98 may be configured to measure a temperature of exhaust gases entering turbine 165. In some examples, an output of EGT sensor 98 may be used by controller 12 to determine a turbine inlet temperature.

After exiting turbine 165, exhaust gases flow downstream in exhaust passage 74 to an emission control device 70.

Emission control device 70 may include one or more emission control devices, such as one or more catalyst bricks and/or one or more particulate filters. For example, emission control device may include a three-way catalyst configured to chemically reduce nitrogen oxides (NOx) and oxidize carbon monoxide (CO) and hydrocarbons (HC). In some examples, emission control device 70 may additionally or alternatively include a gasoline particulate filter (GPF). After passing through emission control device 70, exhaust gases may be directed out to a tailpipe. As an example, the three-way catalyst may be maximally effective at treating exhaust gas with a stoichiometric air-fuel ratio (AFR), as will be elaborated below.

Exhaust passage 74 further includes a plurality of exhaust sensors in electronic communication with controller 12, which is included in a control system 17. As shown in FIG. 2, second exhaust passage 74 includes a first oxygen sensor 90 positioned upstream of emission control device 70. First oxygen sensor 90 may be configured to measure an oxygen content of exhaust gas entering emission control device 70. Second exhaust passage 74 may include one or more additional oxygen sensors positioned along exhaust passage 74, such as a second oxygen sensor 91 positioned downstream of emission control device 70. As such, second oxygen sensor 91 may be configured to measure the oxygen content of the exhaust gas exiting emission control device 70. In one example, one or more of oxygen sensor 90 and oxygen sensor 91 may be a universal exhaust gas oxygen (UEGO) sensor. Alternatively, a two-state exhaust gas oxygen sensor may be substituted for at least one of oxygen sensors 90 and 91. Second exhaust passage 74 may include various other sensors, such as one or more temperature and/or pressure sensors. For example, as shown in FIG. 2, a sensor 96 is positioned within exhaust passage 74 upstream of emission control device 70. Sensor 96 may be a pressure sensor. As such, sensor 96 may be configured to measure the pressure of exhaust gas entering emission control device 70.

First exhaust passage 73 is coupled to an exhaust gas recirculation (EGR) passage 50 included in an EGR system 56. EGR passage 50 fluidically couples exhaust manifold 85 to intake passage 28, downstream of compressor 162. As such, exhaust gases are directed from first exhaust passage 73 to air intake passage 28, downstream of compressor 162, via EGR passage 50, which provides high-pressure EGR. However, in other examples, EGR passage 50 may be coupled to intake passage 28 upstream of compressor 162.

As shown in FIG. 2, EGR passage 50 may include an EGR cooler 52 configured to cool exhaust gases flowing from first exhaust passage 73 to intake passage 28 and may further include an EGR valve 54 disposed therein. Controller 12 is configured to actuate and adjust a position of EGR valve 54 in order to control a flow rate and/or amount of exhaust gases flowing through EGR passage 50. When EGR valve 54 is in a closed (e.g., fully closed) position, no exhaust gases may flow from first exhaust passage 73 to intake passage 28. When EGR valve 54 is in an open position (e.g., from partially open to fully open), exhaust gases may flow from first exhaust passage 73 to intake passage 28. Controller 12 may adjust the EGR valve 54 into a plurality of positions between fully open and fully closed. In other examples, controller 12 may adjust EGR valve 54 to be either fully open or fully closed. Further, in some examples, a pressure sensor 34 may be arranged in EGR passage 50 upstream of EGR valve 54.

As shown in FIG. 2, EGR passage 50 is coupled to intake passage 28 downstream of a charge air cooler (CAC) 40. CAC 40 is configured to cool intake air as it passes through CAC 40. In an alternative example, EGR passage 50 may be coupled to intake passage 28 upstream of CAC 40 (and downstream of compressor 162). In some such examples, EGR cooler 52 may not be included in EGR passage 50, as CAC cooler 40 may cool both the intake air and recirculated exhaust gases. EGR passage 50 may further include an oxygen sensor 36 disposed therein and configured to measure an oxygen content of exhaust gases flowing through EGR passage 50 from first exhaust passage 73. In some examples, EGR passage 50 may include additional sensors, such as temperature and/or humidity sensors, to determine a composition and/or quality of the exhaust gas being recirculated to intake passage 28 from exhaust manifold 85.

Intake passage 28 further includes throttle 62. As shown in FIG. 2, throttle 62 is positioned downstream of CAC 40 and downstream of where EGR passage 50 couples to intake passage 28 (e.g., downstream of a junction between EGR passage 50 and intake passage 28). A position of a throttle plate 64 of throttle 62 may be adjusted by controller 12 via a throttle actuator (not shown) communicatively coupled to controller 12. By modulating throttle 62 while operating compressor 162, a desired amount of fresh air and/or recirculated exhaust gas may be delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from a compressor outlet, upstream of CAC 40, to a compressor inlet. A compressor recirculation valve (CRV) 42 may be provided for adjusting an amount of flow recirculated to the compressor inlet. In one example, CRV 42 may be actuated open via a command from controller 12 in response to actual or expected compressor surge conditions.

Intake passage 28 may include one or more additional sensors (such as additional pressure, temperature, flow rate, and/or oxygen sensors). For example, as shown in FIG. 2, intake passage 28 includes MAF sensor 48 disposed upstream of compressor 162 in intake passage 28. An intake pressure and/or temperature sensor 31 is also positioned in intake passage 28 upstream of compressor 162. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62 (e.g., a throttle inlet pressure sensor). In some examples, as shown in FIG. 2, an additional intake oxygen sensor 39 may be positioned in intake passage 28 between CAC 40 and throttle 62, downstream of the junction between EGR passage 50 and intake passage 28. Further, MAP sensor 122 and an intake manifold temperature sensor 123 are shown positioned within intake manifold 44, upstream of the engine cylinders.

Engine 10 may be controlled at least partially by control system 17, including controller 12, and by input from the vehicle operator (as described above with respect to FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, first exhaust passage 73, second exhaust passage 74, and EGR passage 50, as described above. Other sensors may include a throttle inlet temperature sensor for estimating a throttle air temperature (TCT) coupled upstream of throttle 62 in the intake passage. Further, it should be noted that engine 10 may include all or a portion of the sensors shown in FIG. 2. As another example, actuators 83 may include fuel injectors 66, throttle 62, CRV 42, EGR valve 54, and spark plugs 92. Actuators 83 may further include various camshaft timing actuators coupled to the cylinder intake and exhaust valves (as described above with reference to FIG. 1). Controller 12 may receive input data from the various sensors, process the input data, and trigger the actuators in response to the processed input data based on instruction or code programmed in a memory of controller 12 corresponding to one or more routines. For example, controller 12 may detect and characterize degradation of EGT sensor 98 according to the example methods (e.g., routines) of FIGS. 3 and 4.

The performance of engine 10 may depend upon the reliability and characteristics of the information received by controller 12 from a plurality of sensors. For example, degradation of EGT sensor 98 may degrade engine performance by affecting spark timing adjustments and/or air-fuel ratio adjustments, leading to decreased fuel efficiency and/or increased emissions. In the case of severe degradation of the exhaust gas temperature sensor, engine components may be allowed to overheat, leading to heat-related degradation.

Figure 3:
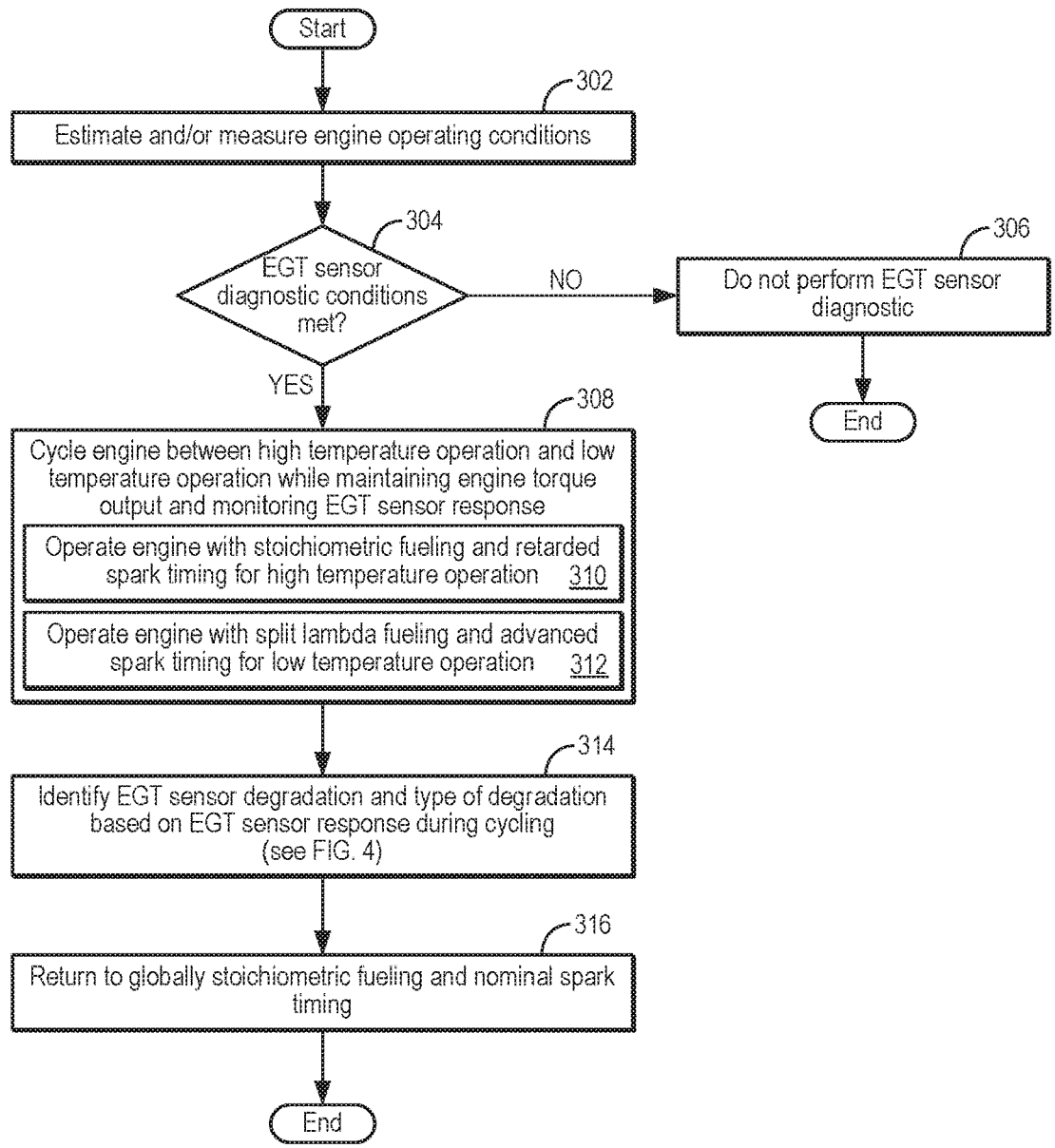
FIG. 3 depicts an example method for producing stepwise changes in exhaust gas temperature via a split lambda fueling strategy for exhaust gas temperature sensor diagnostics.

Therefore, FIG. 3 provides an example method 300 for producing exhaust gas temperature stepwise changes, which may be used to characterize a response of an exhaust gas temperature sensor of an engine system (e.g., EGT sensor 98 of FIG. 2) and determine whether exhaust gas temperature sensor degradation is present. In particular, the exhaust gas temperature stepwise changes may be produced through cylinder-to-cylinder AFR and spark timing adjustments that result in distinct high temperature and low temperature engine operating modes. As used herein, a stepwise change (also referred to as a step change) refers to a non-gradual change that occurs over less than a threshold duration (e.g., 30 seconds). Instructions for carrying out method 300 and the rest of the methods included herein may be executed by a controller (e.g., controller 12 of FIGS. 1 and 2) based on instructions stored on a memory of the controller and in conjunction with signals received from sensors of the engine system, such as the sensors described above with reference to FIGS. 1 and 2, including a signal received from the exhaust gas temperature sensor. The controller may employ engine actuators of the engine system to adjust engine operation, such as by adjusting a spark timing of a spark provided via a spark plug (e.g., spark plug 92 of FIGS. 1-2), according to the methods described below.

At 302, method 300 includes estimating and/or measuring engine operating conditions. The engine operating conditions may include, for example, engine speed, engine load, engine temperature, engine torque demand, an exhaust gas temperature, a commanded AFR, a measured AFR, a spark timing, etc. As one example, the exhaust gas temperature may be measured by the exhaust gas temperature sensor. As another example, the measured AFR may be determined based on output from a UEGO sensor (e.g., UEGO sensor 91 of FIG. 2).

At 304, method 300 includes determining if EGT sensor diagnostic conditions are met. The EGT sensor diagnostic conditions may include a pre-determined set of engine operating conditions that enable the EGT sensor diagnostic to be accurately and reproducibly performed. As one example, the EGT sensor diagnostic conditions may include the exhaust gas temperature being below a first threshold temperature. The first threshold temperature may be a pre-determined, non-zero temperature above which additional temperature exhaust gas temperature increases during execution of the EGT sensor diagnostic may degrade exhaust system components, such as a turbocharger turbine and/or an emission control device. Further, the EGT sensor diagnostic conditions may include the exhaust gas temperature being above a second threshold temperature. The second threshold temperature may be a pre-determined, non-zero temperature below which exhaust temperature decreases may degrade exhaust component performance, such as a performance of the emission control device. As another example, the EGT sensor diagnostic conditions may further include a pre-determined number of engine cycles or pre-determined duration having elapsed since a previous EGT diagnostic was performed. In still another example, the EGT sensor diagnostics may further include the engine operating at steady state. For example, it may be determined that the engine is operating in steady state if the engine speed and/or torque output remains substantially constant for at least a non-zero threshold duration. In some examples, all of the diagnostic conditions may be confirmed for the EGT sensor diagnostic conditions to be considered met.

If the EGT sensor diagnostic conditions are not met, such as when at least one of the EGT sensor diagnostic conditions is not met, method 300 proceeds to 306 and includes not performing the EGT sensor diagnostic. For example, the engine will not be cycled between higher temperature operation and lower temperature operation for the purpose of evaluating the EGT sensor response. Following 306, method 300 ends. As one example, method 300 may be repeated as engine operating conditions change so that the controller may re-evaluate whether the EGT sensor diagnostic conditions are met.

If the EGT sensor diagnostic conditions are met, such as when all of the EGT sensor diagnostic conditions are met, method 300 proceeds to 308 and includes cycling the engine between high temperature operation (also referred to herein as a high temperature mode) and low temperature operation (also referred to herein as a low temperature mode) while maintaining engine torque output and monitoring the EGT sensor response. This includes operating the engine with stoichiometric fueling and retarded spark timing for the high temperature operation, as indicated at 310, and operating the engine with split lambda fueling and advanced spark timing for low temperature operation, as indicated at 312.

Specifically, during the high temperature operation, the engine AFR is maintained at stoichiometry, wherein the air-fuel mixture produces a complete combustion reaction. Herein, the AFR will be discussed as a relative AFR, defined as a ratio of an actual AFR of a given mixture to stoichiometry and represented by lambda ($\lambda$). A lambda value of 1 occurs at stoichiometry (e.g., during stoichiometric operation). Therefore, the controller may determine a fuel pulse width to send to the fuel injector of each cylinder based on an amount of air ingested by the engine in order to maintain the AFR at a lambda value of 1. Further, the engine may operate with stoichiometric fueling during nominal operation outside of the high temperature mode, as stoichiometric exhaust gas increases an efficiency of a downstream catalyst, thereby decreasing vehicle emissions. Nominal stoichiometric operation may include the AFR fluctuating about stoichiometry, such as by $\lambda$ generally remaining within 2% of stoichiometry. For example, the engine may transition from rich to lean and from lean to rich between injection cycles, resulting in an "average" operation at stoichiometry. This is different than the split lambda fueling for the low temperature operation that will be described below.

While the stoichiometric fueling is maintained during the high temperature mode, the retarded spark timing (e.g., the ignition timing retarded relative to nominal spark timing)

increases the exhaust gas temperature due to late energy release. Thus, the high temperature mode produces higher temperature exhaust gas compared with nominal stoichiometric operation. As one example, the controller may determine the retarded spark timing for operating in the high temperature mode based on a desired temperature increase. For example, the controller may input the desired temperature increase and the current engine operating conditions, such engine speed, engine load, and the current exhaust gas temperature, into one or more look-up tables, functions, and maps, which may output the retarded spark timing to achieve the desired temperature increase. The desired temperature increase may be selected to differentiate the temperature change caused by the transition to the high temperature mode from stochastic temperature fluctuations, for example. In one example, the controller may apply spark retard by adjusting the spark timing to the determined retarded spark timing during a single engine cycle. In an alternative example, the controller may retard the spark timing of the cylinders incrementally, such as by further retarding the spark timing by a predetermined amount each engine cycle until the determined retarded spark timing is achieved. Further, the controller may generate a control signal that is sent the ignition system to actuate the spark plug of each cylinder at the determined spark timing.

However, the retarded spark timing may reduce an amount of torque produced by each combustion event (e.g., compared with MBT spark timing). Therefore, at least in some examples, the controller may compensate for the torque reduction due to spark retard by adjusting one or more other torque actuators accordingly. For example, the controller may increase air flow to the engine, such as by adjusting a throttle valve to a further open position, and adjust fueling accordingly to maintain the stoichiometric AFR. In this way, torque disturbances during transitioning the engine from nominal stoichiometric operation to the high temperature mode may be reduced.

The low temperature operation includes operating the engine with split lambda fueling while advancing spark timing relative to the high temperature mode. The split lambda fueling (also referred to as operating in a split lambda mode herein) includes operating a first set (or number) of cylinders at a first, rich AFR and a second (e.g., remaining) set (or number) of the engine cylinders at a second, lean AFR while maintaining stoichiometry at the downstream catalyst. A rich feed ($\lambda<1$) results from air-fuel mixtures with more fuel relative to stoichiometry. For example, when a cylinder is enriched, more fuel is supplied to the cylinder than for producing a complete combustion reaction with an amount of air in the cylinder, resulting in excess, unreacted fuel. In contrast, a lean feed ($\lambda>1$) results from air-fuel mixtures with less fuel relative to stoichiometry. For example, when a cylinder is enleaned, less fuel is delivered to the cylinder than for producing a complete combustion reaction with the amount of air in the cylinder, resulting in excess, unreacted air.

As an example, the first set of cylinders may be operated at a rich AFR having a lambda value in a range from 0.95-0.8 (e.g., 5-20% rich), which is richer than the nominal fluctuation about stoichiometry described above. The second set of cylinders may be operated at a corresponding lean AFR (e.g., in a range from 1.05 to 1.2) to maintain overall stoichiometry at the downstream catalyst. For example, a degree of enleanment of the second set of cylinders may be selected based on a degree of enrichment of the first set of cylinders so that the exhaust gas from the first set of cylinders may mix with the exhaust gas from the second set of cylinders to form a stoichiometric mixture, even while none of the cylinders are operated at stoichiometry. Further, the split rich and lean operation may be maintained over a plurality of engine cycles, as will be elaborated below. A difference between the rich AFR and the lean AFR may be referred to herein as a lambda split.

Operating the engine with split lambda fueling may decrease the exhaust gas temperature compared with both nominal stoichiometric operation and the high temperature operation due to uncombusted fuel, as one example. For example, the uncombusted, liquid fuel in the rich cylinder set may have a higher specific heat than combustion gases, which in turn may lower exhaust gas temperatures during split lambda operation. Thus, split lambda fueling may be used for the low temperature operation.

As one example, the controller may determine the lambda split for operating in the low temperature mode based on a desired temperature decrease. For example, the controller may input the desired temperature decrease and the current engine operating conditions, such engine speed, engine load, and the current exhaust gas temperature, into one or more look-up tables, functions, and maps, which may output the lambda split to achieve the desired temperature decrease. Note that the lambda split may not exceed a maximum value above which misfire may occur, for example. The desired temperature decrease may be selected to differentiate the temperature change caused by the transition to the low temperature mode from stochastic temperature fluctuations, for example. Thus, the determined lambda split may be calculated to achieve a desired lower exhaust gas temperature, while the determined spark retard for the high temperature operation may be calculated to achieve a desired higher exhaust gas temperature.

In one example, the lambda split between the first set of cylinders and the second set of cylinders may be stepped to the determined lambda split over one engine cycle. For example, the controller may adjust a pulse width of a signal FPW sent to the fuel injector of each cylinder based on the commanded AFR of the particular cylinder (e.g., whether the cylinder is in the first set or the second set) and a cylinder air charge amount, such as via a look-up table or function, in order to operate the first cylinder set at the rich AFR and the second cylinder set at the lean AFR. In an alternative example, the lambda split between the first cylinder set and the second cylinder set may be gradually increased over a plurality of engine cycles. For example, the lambda split may be incrementally increased cycle-by-cycle until the determined lambda split is reached. This may include the controller further enriching the first set of cylinders each engine cycle and further enleaning the second set of cylinders by a corresponding amount to maintain a stoichiometric exhaust gas mixture at the emission control device.

However, changes in fueling (e.g., switching between stoichiometric fueling and split lambda fueling) may create changes in engine torque. In an illustrative, non-limiting example, operating the engine with a lambda split of 0.2 (e.g., with the first set of cylinders operating at a lambda value of 0.9 and the second set of cylinders operating at a lambda value of 1.1) may lead to a torque reduction of 2% relative to stoichiometric operation, with the rich cylinders producing more torque than the stoichiometric operation and the lean cylinders producing less torque than the stoichiometric operation. Such torque fluctuations may impact vehicle handling. As one example, torque fluctuations may affect smoothness in engine operation. Thus, the low temperature mode combines fueling adjustments with ignition timing adjustments to achieve balanced torque between the high temperature operation and the low temperature operation.

Specifically, during the low temperature operation, the spark timing of each cylinder may be advanced relative to the retarded timing of the high temperature operation, thus increasing the amount of torque output while also reducing the amount of heat released to the exhaust gas. As an example, the controller may directly determine the spark timing of each cylinder by inputting one or more of the AFR of the particular cylinder (or cylinder set) and the torque during the high temperature operation into a look-up table, function, or map, which may output the advanced spark timing for the each cylinder that is anticipated to balance the torque output between the high and low temperature cycles. Further, the controller may generate a control signal that is sent the ignition system to actuate the spark plug of each cylinder at the determined spark timing for that individual cylinder. As another example, the controller may determine the advanced spark timing for each set of cylinders based on logic rules that are a function of the torque during the high temperature operation and the commanded AFR of the cylinder or cylinder set. As a further example, the spark timing of the lean cylinder set may be further advanced than the rich cylinder set to compensate for different burn rates of the differently fueled cylinders.

The controller may determine a duration (or number of engine cycles) and frequency of the cycling based on one or more engine operating parameters, such as with the use of one or more look-up tables stored in controller memory. For example, the controller may determine both a duration for operating in each temperature mode as well as a duration for cycling the engine between the high (e.g., higher) temperature operation and the low (e.g., lower) temperature operation. As another example, the controller may determine a number of times to cycle between the high temperature mode and the low temperature mode, referred to herein as temperature cycling. As another example, the controller may determine the frequency and duration of temperature cycling based on logic rules that are a function of one or more engine operating parameters. As another example, the duration and frequency of the temperature cycling may be a function of the measured EGT sensor response, such that the commanded stepwise changes to temperature are sufficient to exceed stochastic noise in EGT sensor response. Further, the stochastic noise in the EGT sensor response may change based on engine operating conditions such as engine speed, engine load, and ignition timing. The duration of each temperature mode (e.g., the low temperature operation or the high temperature operation) may last up to several minutes, at least in some examples. As such, maintaining constant engine torque during the cycling increases vehicle performance and customer satisfaction. The duration and frequency of the temperature cycling may be stored in memory in the engine controller, for example, during each diagnostic test.

As one illustrative, non-limiting example, the temperature cycling may include three hot-to-cold transitions and three cold-to-hot transitions, each pair of one hot-to-cold and one cold-to-hot transition comprising one temperature cycle, and the controller may continuously monitor the EGT sensor response during three temperature cycles. For example, the engine may be transitioned from nominal stoichiometric operation to the high temperature operation. The engine may continue to operate in the high temperature mode for a determined number of engine cycles or for a determined duration, determined as described above. Upon completion of the determined number of engine cycles or determined duration, the controller may transition the engine to the low temperature operation, resulting in the first hot-to-cold transition. The engine may continue to operate in the low temperature operation for the determined number of engine cycles or for the determined duration. Upon completion of the determined number of engine cycles or determined duration, the controller may transition the engine back to the high temperature operation, resulting in the first cold-to-hot transition and the completion of the first temperature cycle. This process may be repeated until the final (e.g., third) temperature cycle ends, as will be elaborated below.

Thus, the cycling the engine between the high temperature operation and the low temperature operation at 308 may include differently modulating a first commanded AFR and a first spark timing in the first set of cylinders and a second commanded AFR and a second spark timing in the second set of cylinders in order to produce exhaust temperature modulations between a higher temperature and a lower temperature. The first commanded AFR may be modulated between stoichiometry (e.g., for a first number of engine cycles) and the rich AFR (e.g., for a second number of engine cycles immediately following the first number of engine cycles). The second commanded AFR may be modulated between stoichiometry (e.g., for the first number of engine cycles) and the lean AFR (e.g., for the second number of engine cycles). The first spark timing (e.g., a first non-uniform spark timing) may be modulated between a first retarded spark timing (e.g., for the first number of engine cycles) and a second retarded spark timing (e.g., for the second number of engine cycles) that is less retarded than the first retarded spark timing. The second spark timing (e.g., a second non-uniform spark timing) may be modulated between the first retarded spark timing (e.g., for the first number of engine cycles) and a third retarded spark timing (e.g., for the second number of engine cycles) that is less retarded than both of the first retarded spark timing and the second retarded spark timing.

In this way, the controller maintains constant engine torque (e.g., brake torque) while modulating exhaust gas temperature over a plurality of engine cycles through differently modulating a first commanded AFR and a first spark timing in the first set of cylinders and a second commanded AFR and a second spark timing in the second set of cylinders between one or more engine cycles while maintaining global stoichiometry and brake torque across the plurality of engine cycles. By maintaining constant torque during temperature cycling, the EGT sensor diagnostic may collect EGT sensor readings without affecting engine performance via torque fluctuations.

Continuing with method 300, at 314, the method includes identifying EGT sensor degradation and a type of the degradation based on the EGT sensor response during cycling, as will be elaborated below with respect to FIG. 4. For example, the controller may distinguish between symmetric delay degradation (e.g., the EGT sensor response to both hot-to-cold and cold-to-hot exhaust gas temperature stepwise changes is delayed), asymmetric delay degradation (e.g., the EGT sensor response to one of hot-to-cold and cold-to-hot exhaust gas temperature stepwise changes is delayed), symmetric slew rate degradation (e.g., the EGT sensor response rate to both hot-to-cold and cold-to-hot exhaust gas temperature stepwise changes is low), and asymmetric slew rate degradation (e.g., the EGT sensor response rate to one of hot-to-cold and cold-to-hot exhaust gas temperature stepwise changes is low) by evaluating the EGT response obtained during the temperature cycling. As an example, the controller may distinguish a symmetric delay degradation in the EGT sensor response by determining that the EGT sensor response is delayed from the expected EGT sensor response during transitions from high temperature operation to low temperature operation and during transitions from low temperature operation to high temperature operation. As another example, the controller may distinguish an asymmetric slew rate degradation in the EGT sensor response by determining that the EGT sensor responds at a slower rate than the expected EGT sensor response during high to low temperature transitions but responds at the same rate as the expected EGT sensor response during low to high temperature transitions. As a further example, the controller may distinguish more than one type of sensor degradation in the EGT sensor response, such as a combination of asymmetric delay degradation and symmetric slew rate degradation.

At 316, method 300 includes returning to globally stoichiometric fueling and nominal spark timing. For example, every cylinder of the engine may be uniformly operated at stoichiometry, with a lambda split of zero, and with nominal spark timing following completion of the final temperature cycle. The controller may adjust the spark timing to the nominal spark timing for operating the engine at stoichiometry at the current engine speed and load, and the spark timing for every cylinder may be approximately the same. As one example, the nominal spark timing may be at or near MBT spark timing for each engine cylinder. Further, additional engine operating parameters may be adjusted in order to maintain the engine torque output relatively constant. For example, the engine load may be decreased, such as by further closing a throttle valve, in order to compensate for an effect of the advanced spark timing relative to the high temperature operation. Method 300 may then end.

Figure 4:
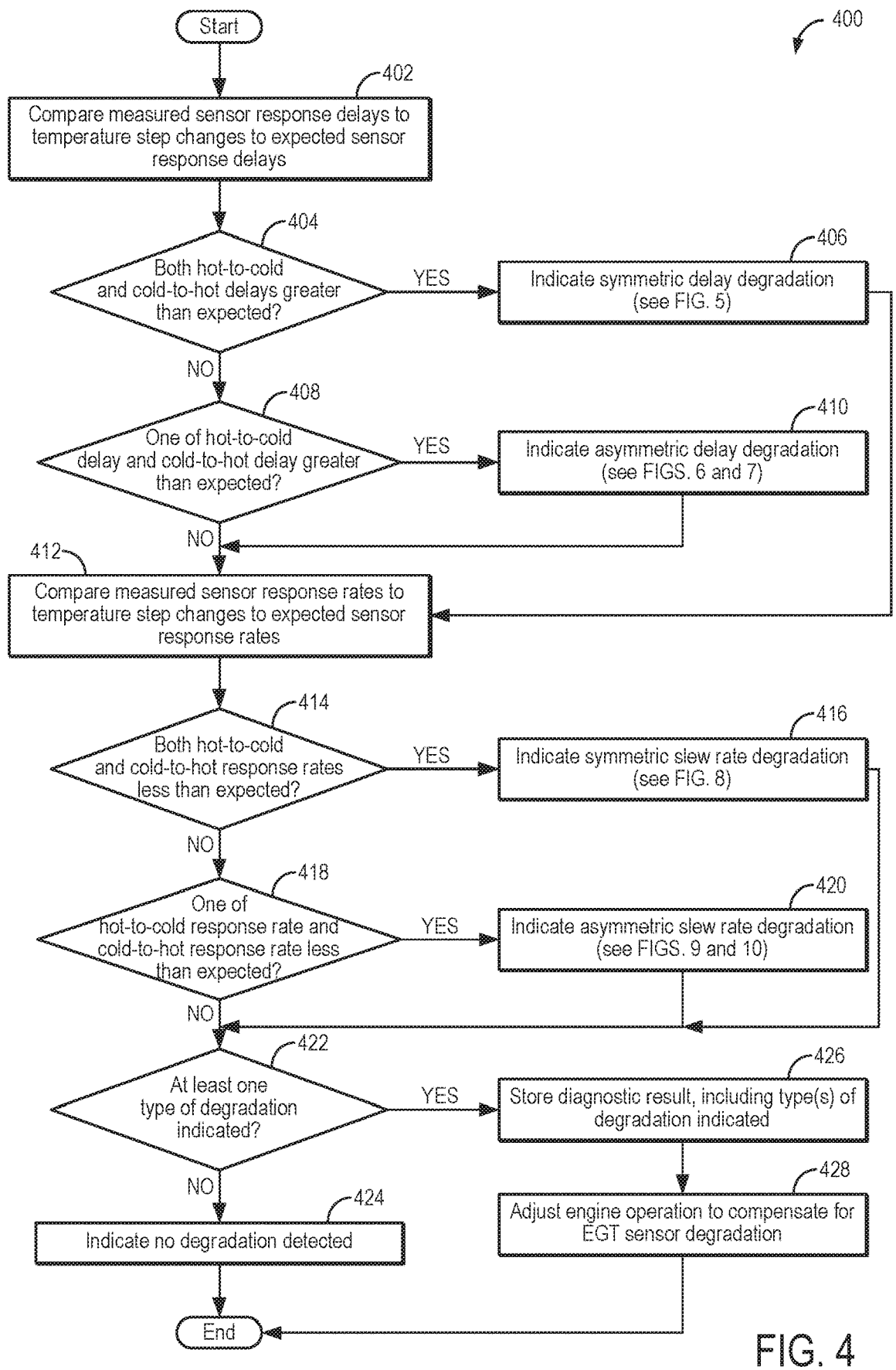
FIG. 4 shows an example method for detecting and characterizing exhaust gas temperature degradation during temperature cycling.

Continuing to FIG. 4, an example method 400 for identifying EGT sensor degradation and characterizing the type(s) of degradation present is shown. For example, method 400 may be executed as a part of method 300 of FIG. 3 (e.g., at 314) to distinguish between degraded and non-degraded EGT sensor responses based on the sensor output obtained during the cycling between the high temperature engine operation and the low temperature engine operation. For example, the controller may evaluate the EGT sensor response for two types of EGT sensor degradation: signal delay degradation and slew rate degradation. Further, each type of sensor degradation may be either symmetric or asymmetric, and in some examples, the EGT sensor may display both types of degradation behavior. For example, the EGT sensor may exhibit asymmetric slew rate degradation along with symmetric signal delay degradation. Thus, method 400 may identify multiple sensor degradation types during the diagnostic.

At 402, method 400 includes comparing measured sensor response delays to temperature step changes to expected sensor response delays to the temperature step changes. A sensor response delay refers to a time delay between the temperature step change being commanded and an output of the sensor changing. For example, a hot-to-cold response delay may occur following a transition from the high temperature operation to the low temperature operation (e.g., a hot-to-cold stepwise temperature change), and a cold-to-hot response delay may occur following a transition from the low temperature operation to the hot temperature operation (e.g., a cold-to-hot stepwise temperature change). The expected sensor response delays for both the hot-to-cold stepwise temperature change and the cold-to-hot stepwise temperature change may be pre-calibrated values stored in non-transitory memory. Therefore, the controller may determine the hot-to-cold sensor response delay based on an elapsed time (e.g., duration) between the hot-to-cold temperature step change being commanded (e.g., by adjusting engine fueling and spark timing, as described above with respect to FIG. 3) and the corresponding decrease in the temperature measured by the EGT sensor and compare the determined hot-to-cold sensor response delay to the expected hot-to-cold sensor response delay stored in memory. Similarly, the controller may determine the cold-to-hot sensor response delay based on an elapsed time between the cold-to-hot temperature step change being commanded and the corresponding increase in the temperature measured by the EGT sensor and compare the determined cold-to-hot sensor response delay to the expected cold-to-hot sensor response delay stored in memory.

In some examples, the measured time delay may be directly compared to the expected time delay for each hot-to-cold and each cold-to-hot transition in the data set. In other examples, the measured time delays for all of the hot-to-cold transitions in the data set may be averaged, and the average time delay for all of the hot-to-cold transitions may be compared to the expected time delay for the hot-to-cold transition. Similarly, the measured time delays for all of the cold-to-hot transitions in the data set may be averaged, and the average time delay for all of the cold-to-hot transitions may be compared to the expected time delay for the cold-to-hot transition. Although both high temperature to low temperature and low temperature to high temperature transitions are described for diagnosing the EGT sensor response, it may be appreciated that in other examples, just the entry into or the exit out of the high temperature operation may be used for evaluating the EGT sensor response.

At 404, method 400 includes determining if both the hot-to-cold and the cold-to-hot sensor response delays are greater than the expected hot-to-cold and cold-to-hot sensor response delays. As one example, the hot-to-cold sensor response delay may be considered greater than the expected hot-to-cold sensor response delay when the determined hot-to-cold sensor response delay is at least a first threshold amount greater than the expected hot-to-cold sensor response delay. The first threshold amount may be a pre-determined, non-zero value or a pre-determined, non-zero percentage value that differentiates nominal response discrepancies from delay due to EGT sensor degradation. As another example, the hot-to-cold sensor response delay may be considered greater than the expected hot-to-cold sensor response delay when the hot-to-cold sensor response delay is greater than a threshold delay. The threshold delay may be a pre-determined, non-zero value stored in a memory of the controller that is the same for each EGT sensor diagnostic performed. Alternatively, the threshold delay may be adjusted based on a predicted change in the exhaust gas temperature during the temperature stepwise change and/or other engine operating parameters. Similarly, the cold-to-hot sensor response delay may be considered greater than the expected cold-to-hot sensor response delay when the determined cold-to-hot sensor response delay at least the first threshold amount greater than the expected cold-to-hot sensor response delay and/or greater than the threshold delay.

If both the hot-to-cold and the cold-to-hot sensor response delays are greater than the expected hot-to-cold and cold-to-hot sensor response delays, method 400 proceeds to 406 and includes indicating symmetric delay degradation. That is, the EGT sensor has a degraded response delay to both hot-to-cold temperature stepwise changes and cold-to-hot temperature stepwise changes, an example of which is illustrated with respect to FIG. 5 and will be described below. The EGT sensor response may be further evaluated for response rate delay degradation, as will be further described below.

If both of the hot-to-cold and the cold-to-hot sensor response delays are not greater than the expected hot-to-cold and cold-to-hot sensor response delays, method 400 proceeds to 408 and includes determining if one of the hot-to-cold and cold-to-hot sensor response delays is greater than expected. That is, the controller may determine if either the hot-to-cold sensor response delay is greater than the expected hot-to-cold sensor response delay or the cold-to-hot sensor response delay is greater than the expected cold-to-hot sensor response delay, as described above at 404. As one example, the hot-to-cold sensor response delay may be greater than the expected hot-to-cold sensor response delay while the cold-to-hot sensor response delay is not greater than the expected cold-to-hot sensor response delay. As another example, the cold-to-hot sensor response delay may be greater than the expected cold-to-hold sensor response delay while the hot-to-cold sensor response delay is not greater than the expected hot-to-cold sensor response delay.

If one of the hot-to-cold and cold-to-hot sensor response delays is greater than expected, method 400 proceeds to 410 and includes indicating asymmetric delay degradation. Indicating asymmetric delay degradation includes indicating the type of delay degradation, such as whether the hot-to-cold sensor response delay or cold-to-hot sensor response delay is present. Examples of the two different types of asymmetric delay degradation are illustrated with respect to FIGS. 6 and 7 and will be described below.

If neither of the hot-to-cold and cold-to-hot sensor response delays is greater than expected, method 400 proceeds to 412 and includes comparing measured sensor response rates (e.g., slew rates) to the temperature step changes to expected sensor response rates to the temperature step changes. Slew rate refers to a rate of change of the EGT sensor output over time in response to a temperature stepwise change occurring, such as during the sensor response immediately following the response delay. Sensor slew rate degradation refers to a sensor slew rate that is lower than the expected slew rate (e.g., the sensor response increases or decreases more slowly than expected over a given amount of time). For example, hot-to-cold slew rate degradation may occur following a transition from the high temperature operation to the low temperature operation (e.g., a hot-to-cold stepwise temperature change), such as when the EGT sensor output decreases more slowly than expected (e.g., a magnitude of the slew rate is less than expected) in response to the temperature decrease resulting from the transition to the low temperature operation. As another example, cold-to-hot slew rate degradation may occur following a transition from the low temperature operation to the hot temperature operation (e.g., a cold-to-hot stepwise temperature change), such as when the EGT sensor output increases more slowly than expected in response to the temperature increase resulting from the transition to the high temperature operation.

As an example, the expected sensor slew rates for both the hot-to-cold stepwise temperature change and the cold-to-hot stepwise temperature change may be pre-calibrated values stored in non-transitory memory. Therefore, the controller may determine the hot-to-cold sensor slew rate based on a rate of decrease in the temperature measured by the EGT sensor in response to the hot-to-cold stepwise temperature change being commanded and compare the determined hot-to-cold sensor slew rate to the expected hot-to-cold sensor slew rate stored in memory. Similarly, the controller may determine the cold-to-hot sensor slew rate based on a rate of increase in the temperature measured by the EGT sensor in response to the cold-to-hot stepwise temperature change being commanded and compare the determined cold-to-hot sensor response slew rate to the expected cold-to-hot sensor response slew rate stored in memory.

In some examples, the measured slew rate may be directly compared to the expected slew rate for each hot-to-cold and each cold-to-hot transition in the data set. In other examples, the measured slew rates for all of the hot-to-cold transitions in the data set may be averaged, and the average slew rate for all of the hot-to-cold transitions may be compared to the expected slew rate for the hot-to-cold transition. Similarly, the measured time slew rates for all of the cold-to-hot transitions in the data set may be averaged, and the average slew rate for all of the cold-to-hot transitions may be compared to the expected slew rate for the cold-to-hot transition. Although both high temperature to low temperature and low temperature to high temperature transitions are described for diagnosing the EGT sensor slew rate, it may be appreciated that in other examples, just the entry into or the exit out of the high temperature operation may be used for evaluating the EGT sensor slew rate.

At 414, method 400 includes determining if both the hot-to-cold and the cold-to-hot sensor response rates are less than the expected hot-to-cold and cold-to-hot sensor response rates. As one example, the hot-to-cold sensor response rate may be considered less than the expected hot-to-cold sensor response rate when the determined hot-to-cold sensor response rate is at least a second threshold amount less than the expected hot-to-cold sensor response rate. The second threshold amount may be a pre-determined, non-zero value or a pre-determined, non-zero percentage value that differentiates nominal response discrepancies from slew rate changes due to EGT sensor degradation. The second threshold amount may be a same or different amount than the first threshold amount defined above at 404. As another example, the hot-to-cold sensor response rate may be considered less than the expected hot-to-cold sensor response rate when the determined hot-to-cold sensor response rate is less than a threshold response rate. The threshold response rate may be a pre-determined, non-zero value stored in a memory of the controller that is the same for each EGT sensor diagnostic performed. Alternatively, the threshold response rate may be adjusted based on the predicted change in the exhaust gas temperature during the temperature stepwise change and/or other engine operating parameters. Similarly, the cold-to-hot sensor response rate may be considered less than the expected cold-to-hot sensor response rate when the determined cold-to-hot sensor response rate is at least the second threshold amount less than the expected cold-to-hot sensor response rate and/or less than the threshold response rate. Because the hot-to-cold and cold-to-hot slew rates may have different directionality (e.g., negative and positive, respectively), only a magnitude of the rate may be evaluated, at least in some examples.

If both the hot-to-cold and the cold-to-hot sensor response rates are less than the expected hot-to-cold and cold-to-hot sensor response rates, method 400 proceeds to 416 and includes indicating symmetric slew rate degradation. That is, the EGT sensor has a degraded response rate to both hot-to-cold temperature stepwise changes and cold-to-hot temperature stepwise changes, an example of which will be illustrated with respect to FIG. 8.

If both of the hot-to-cold and the cold-to-hot sensor response rates are not less than the expected hot-to-cold and cold-to-hot sensor response rates, method 400 proceeds to 418 and includes determining if one of the hot-to-cold and cold-to-hot sensor response rates is less than expected, as described above at 414. As one example, the hot-to-cold sensor response rate may be less than the expected hot-to-cold sensor response rate while the cold-to-hot sensor response rate is not less than the expected cold-to-hot sensor response rate. As another example, the cold-to-hot sensor response rate may be less than the expected cold-to-hot sensor response rate while the hot-to-cold sensor response rate is not less than the expected hot-to-cold sensor response rate.

If one of the hot-to-cold and the cold-to-hot sensor response rates is less than the corresponding expected sensor response rate, method 400 proceeds to 420 and includes indicating asymmetric slew rate degradation. Indicating asymmetric slew rate degradation includes indicating the type of slew rate degradation, such as whether the hot-to-cold slew rate or cold-to-hot slew rate is degraded. Examples of the two different types of asymmetric slew rate degradation are illustrated with respect to FIGS. 9 and 10 and will be described below.

At 422, method 400 includes determining whether at least one type of degradation is indicated. For example, the controller may determine that at least one type of degradation is indicated when any of the symmetric delay degradation, asymmetric delay degradation, symmetric slew rate degradation, and asymmetric slew rate degradation has been indicated. As another example, the controller may determine that at least one type of degradation has not been indicated when none of the symmetric delay degradation, asymmetric delay degradation, symmetric slew rate degradation, and asymmetric slew rate degradation have been indicated.

If no degradation has been indicated, method 400 proceeds to 424 and includes indicating that no degradation is detected. For example, the controller may log the result in memory, including that the EGT sensor diagnostic test occurred and that no degradation is present. As such, the EGT sensor may be considered to be operating nominally. The controller may schedule a next EGT sensor diagnostic test or reset a counter that monitors the number of engine cycles or time duration since the EGT diagnostic test was performed. Method 400 may then end.

If at least one type of degradation is indicated, method 400 proceeds to 426 and includes storing the diagnostic result, including the type(s) of degradation indicated. As an example, the controller may log the result in memory, including that the EGT sensor diagnostic test was completed and that one or more types of degradation was detected (e.g., one of symmetric delay degradation, cold-to-hot delay degradation, and hot-to-cold delay degradation, alone or in combination with one of symmetric slew rate degradation, cold-to-hot slew rate degradation, and hot-to-cold slew rate degradation). The controller may set a pre-determined diagnostic trouble code (DTC) corresponding to the type(s) of degradation detected and may illuminate a malfunction indicator lamp (MIL) to alert a vehicle operator to the degradation. The controller may also schedule a next EGT sensor diagnostic test.

At 428, method 400 includes adjusting engine operation to compensate for the EGT sensor degradation. For example, engine control that uses exhaust temperature as a parameter may be adjusted to anticipate a margin of error in the temperature measured by the EGT sensor. As such, more conservative temperature values may be used for protective temperature thresholds. As one non-limiting example, a threshold temperature for activating protection of a gas particulate filter may be reduced from 950° C. to 850° C. In an alternative example, the additional margin of error may be selectively applied to the engine control based on the type of degradation present. For example, asymmetric hot-to-cold delay degradation and/or hot-to-cold slew rate degradation may result in adjustments to temperature thresholds that may be reached when going from hotter exhaust temperature conditions to colder exhaust temperature conditions because the degradation specifically affects EGT sensor readings during hot-to-cold temperature transitions. Conversely, asymmetric cold-to-hot delay degradation and/or cold-to-hot slew rate degradation may result in conservative adjustments to temperature thresholds that are expected to be reached when going from colder exhaust temperatures to hotter exhaust temperatures because the degradation specifically affects EGT sensor readings during cold-to-hot temperature transitions. Following 428, method 400 may end.

Together, the methods of FIGS. 3 and 4 provide a robust diagnostic method for monitoring and characterizing EGT sensor degradation. By using AFR and spark timing adjustments to alternate between high and low temperature operating modes, exhaust temperature stepwise changes are provided to the exhaust gas temperature sensor. Further, both engine torque output and an overall exhaust gas AFR of stoichiometry may be maintained during cycling between the low temperature and the high temperature operating modes, decreasing torque disturbances and decreasing vehicle emissions. As a result, noise, vibration, and harshness (NVH) may be reduced during the diagnostic, thereby increasing customer satisfaction.

Next, FIGS. 5-10 illustrate six distinct types of degraded response behavior for an exhaust gas temperature sensor. FIGS. 5-10 will be described collectively, with each including a dotted plot 502 showing a commanded temperature change in the exhaust gas that may be achieved by switching the engine between a low temperature operating mode and a high temperature operating mode, such as described above with respect to FIG. 3, so that the engine progresses through at least one temperature cycle including one hot-to-cold (e.g., high temperature operation to low temperature operation) transition and one cold-to-hot (e.g., low temperature to high temperature operation) transition. Each graph further includes a dashed plot 504 showing an expected EGT sensor output (e.g., a measured temperature) that may occur responsive to the temperature stepwise changes when the EGT sensor is functioning nominally. The horizontal axis of each graph represents time (e.g., in minutes), with time increasing along the horizontal axis from left to right, and the vertical axis represents exhaust gas temperature, with temperature increasing up the vertical axis from bottom to top.

Figures 5, 6, 7, 8, 9, 10:
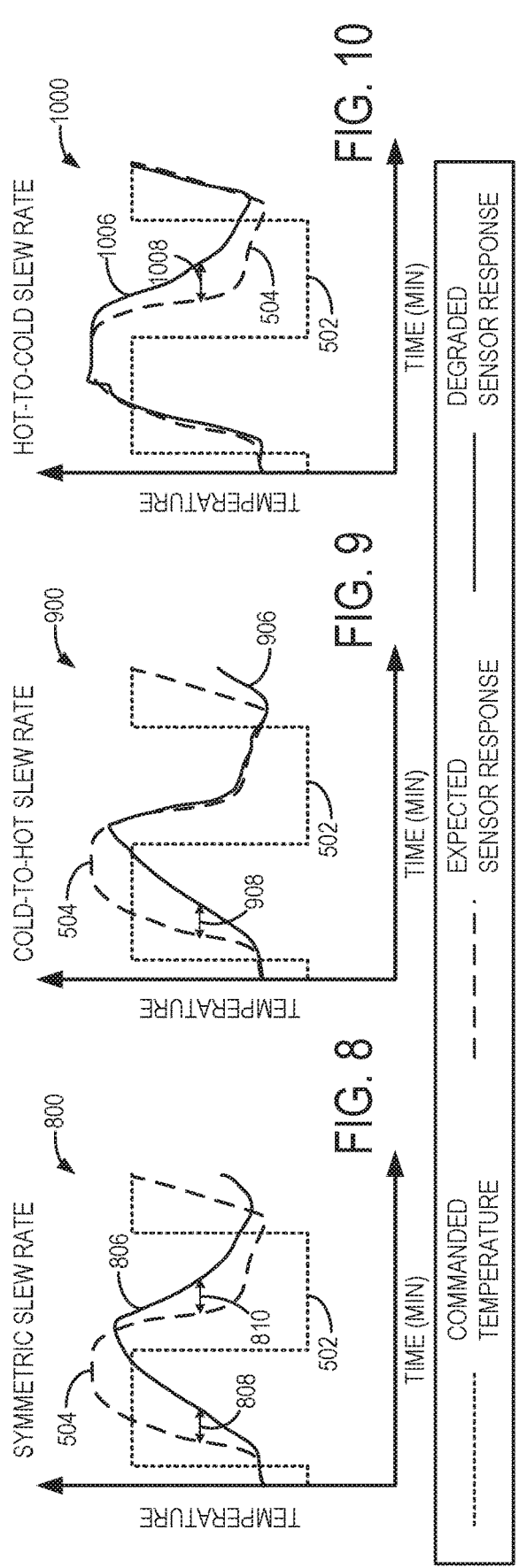
FIG. 5 shows a graph illustrating a symmetric slew rate degradation behavior of an exhaust gas temperature sensor.
FIG. 6 shows a graph illustrating an asymmetric cold-to-hot slew rate degradation behavior of an exhaust gas temperature sensor.
FIG. 7 shows a graph illustrating an asymmetric hot-to-cold slew rate degradation behavior of an exhaust gas temperature sensor.
FIG. 8 shows a graph illustrating a symmetric delay degradation behavior of an exhaust gas temperature sensor.
FIG. 9 shows a graph illustrating an asymmetric cold-to-hot delay degradation behavior of an exhaust gas temperature sensor.
FIG. 10 shows a graph illustrating an asymmetric hot-to-cold delay type degradation behavior of an exhaust gas temperature sensor.

Turning first to FIG. 5, an example graph 500 shows a first type of degradation behavior that may be exhibited by a degraded exhaust gas temperature sensor. Specifically, graph 500 shows a first degraded sensor response in plot 506. When the commanded exhaust temperature changes from low (e.g., cold) to high (e.g., hot), as shown plot 502, there is a delay between the first degraded (e.g., actual) EGT sensor response (plot 506) and the expected EGT sensor response (plot 504), as indicated by an arrow 508. When the commanded exhaust temperature (plot 502) changes from high to low, there is also a delay between the degraded EGT sensor response (plot 506) and the expected EGT sensor response (plot 504), as indicated by an arrow 510. Thus, the degraded EGT sensor response (plot 506) is shifted to the right relative to the expected EGT sensor response (plot 510), while the EGT sensor response time at peak amplitude (as well as the peak response amplitude itself) remains unchanged. Thus, the response delay degradation is symmetric, occurring during both cold-to-hot and hot-to-cold transitions. For example, the degraded temperature signal output by the EGT sensor (plot 506) starts to transition from cold-to-hot measurements and hot-to-cold measurements at times that are delayed from the expected times, but the respective transition may occur at the expected response rate, which results in shifted high temperature and low temperature peak times.

Continuing to FIGS. 6 and 7, an example graph 600 (FIG. 6) shows an EGT sensor response exhibiting asymmetric cold-to-hot delay degradation, and an example graph 700 (FIG. 7) shows an EGT sensor response exhibiting asymmetric hot-to-cold delay degradation. Thus, FIG. 6 shows a second type of degradation behavior that may be exhibited by a degraded exhaust gas temperature sensor, and FIG. 7 shows a third type of degradation behavior that may be exhibited by a degraded exhaust gas temperature sensor. Specifically, graph 600 of FIG. 6 shows a second degraded EGT sensor response in plot 606, and graph 700 of FIG. 7 shows a third degraded EGT sensor response in plot 706.

When the commanded exhaust temperature changes from low (e.g., cold) to high (e.g., hot), as shown plot 502, graph 600 of FIG. 6 shows a delay between the second degraded EGT sensor response (plot 606) and the expected EGT sensor response (plot 504), as indicated by an arrow 608. In contrast, the third degraded sensor response (plot 706) of graph 700 of FIG. 7 closely follows the expected EGT sensor response (plot 504) during the same cold-to-hot transition without a delay. Thus, the second degraded EGT sensor response (plot 606) of graph 600 exhibits cold-to-hot delay degradation behavior, while the third degraded EGT sensor response (plot 706) of graph 700 does not.

During a subsequent transition from high temperature to low temperature operation, there is no delay between the second degraded EGT sensor response (plot 606) and the expected EGT sensor response (plot 504) in graph 600, whereas there is a delay between the third degraded EGT sensor response (plot 706) and the expected EGT sensor response (plot 504) in FIG. 7, as shown by an arrow 708. Thus, the third degraded EGT sensor response (plot 706) of graph 700 exhibits hot-to-cold delay degradation behavior, while the second degraded EGT sensor response (plot 606) of graph 600 does not.

Because the second degraded EGT sensor response (plot 606 of graph 600) includes the delayed response to the cold-to-hot temperature stepwise change and not to the hot-to-cold temperature stepwise change, the EGT sensor of FIG. 6 is characterized as having asymmetric cold-to-hot delay degradation. That is, the temperature signal output by the degraded EGT sensor may start to transition from cold-to-hot at a time that is delayed from the expected time, but the transition may occur at the expected response rate, which results in shifted and/or reduced high temperature peak times. This type of behavior is considered asymmetric because the response of the EGT sensor is delayed from the expected start time during the transition from low temperature to high temperature operation, but is not delayed from the expected start time during the transition from high temperature operation to low temperature operation. Example graph 600 illustrates this asymmetry graphically, as the delayed cold-to-hot response (and nominal hot-to-cold response) shortens the EGT sensor response time at peak amplitude compared with the nominal EGT sensor response shown in plot 504.

Because the third degraded EGT sensor response (plot 706 of graph 700) includes the delayed response to the hot-to-cold temperature stepwise change and not to the cold-to-hot temperature stepwise change, the EGT sensor of FIG. 7 is characterized as having asymmetric hot-to-cold delay degradation. That is, the temperature signal output by the degraded EGT sensor may start to transition from hot-to-cold at a time that is delayed from the expected time, but the transition may occur at the expected response rate, which results in shifted and/or reduced low temperature peak times. This type of behavior is considered asymmetric because the response of the EGT sensor is delayed from the expected start time during the transition from high to low temperature operation, but is not delayed from the expected start time during the transition from low to high temperature operation. Example graph 700 further illustrates this asymmetry graphically, as the delayed hot-to-cold response (and nominal cold-to-hot response) lengthens the EGT sensor response time at peak amplitude compared with the nominal EGT sensor response shown in plot 504.

FIG. 8 shows an example graph 800 of a fourth type of degradation behavior that may be exhibited by a degraded exhaust gas temperature sensor. Specifically, graph 800 shows a fourth degraded sensor response in plot 806. When the commanded exhaust temperature changes from low (e.g., cold) to high (e.g., hot), as shown plot 502, the fourth degraded EGT sensor response (plot 806) responds to the temperature change at a same time as the expected EGT sensor response (plot 504). However, a rate at which the fourth degraded EGT sensor response increases is less than the expected EGT sensor response, as indicated by an arrow 808. For example, it takes longer for the fourth degraded EGT sensor output (plot 806) than the expected EGT sensor output (plot 504) to reach a same temperature value.

Similarly, when the commanded exhaust temperature (plot 502) changes from high to low, there is also not a delay between the fourth degraded EGT sensor response (plot 806) and the expected EGT sensor response (plot 504). However, the rate at which the fourth degraded EGT sensor response decreases is less than the expected EGT sensor response, as indicated by an arrow 810. Thus, the fourth degraded EGT sensor response shows symmetric slew rate type degradation behavior (e.g., a smaller response rate to a commanded temperature) that includes slower changes in the EGT sensor output to the commanded temperature changes for both cold-to-hot and hot-to-cold modulation. For example, the degraded EGT sensor output starts to transition from cold-to-hot and hot-to-cold at the expected times but the response rate is lower than the expected response rate, which results in reduced high temperature and low temperature peak times. Example graph 800 further illustrates this result graphically, as the degraded EGT sensor response (plot 806) is not delayed relative to the expected EGT sensor response (plot 504) but is widened and shortened during both transitions due to symmetric slew rate degradation, thus reducing peak amplitude.

Continuing to FIGS. 9 and 10, an example graph 900 (FIG. 9) shows an EGT sensor response exhibiting asymmetric cold-to-hot slew rate degradation, and an example graph 1000 (FIG. 10) shows an EGT sensor response exhibiting asymmetric hot-to-cold slew rate degradation. Thus, FIG. 9 shows a fifth type of degradation behavior that may be exhibited by a degraded exhaust gas temperature sensor, and FIG. 10 shows a sixth type of degradation behavior that may be exhibited by a degraded exhaust gas temperature sensor. Specifically, graph 900 of FIG. 9 shows a fifth degraded EGT sensor response in plot 906, and graph 1000 of FIG. 10 shows a sixth degraded EGT sensor response in plot 1006.

When the commanded exhaust temperature changes from low (e.g., cold) to high (e.g., hot), as shown plot 502, the fifth degraded EGT sensor response (plot 906) begins increasing at approximately the same time as the expected EGT sensor response (plot 504). Thus, no delay degradation is present during the cold-to-hot transition. However, a rate at which the fifth degraded EGT sensor response increases is less than the expected EGT sensor response, as indicated by an arrow 908. For example, it takes longer for the fifth degraded EGT sensor output (plot 906) than the expected EGT sensor output (plot 504) to reach a same temperature value during the cold-to-hot transition. In contrast, the sixth degraded sensor response (plot 1006) of graph 1000 of FIG. 10 closely follows the expected EGT sensor response (plot 504) during the same cold-to-hot transition. Thus, the fifth degraded EGT sensor response (plot 906) of graph 900 exhibits cold-to-hot slew rate degradation behavior, while the sixth degraded EGT sensor response (plot 1006) of graph 1000 does not.

During a subsequent transition from high temperature to low temperature operation, fifth degraded EGT sensor response (plot 906) closely follows the expected EGT sensor response (plot 504) in graph 900, whereas the sixth degraded EGT sensor response (plot 1006) decreases at a slower rate than the expected EGT sensor response (plot 504) in FIG. 10, as shown by an arrow 1008. That is, it takes longer for the sixth degraded EGT sensor output (plot 1006) than the expected EGT sensor output (plot 504) to reach a same temperature value during the hot-to-cold transition. Thus, the sixth degraded EGT sensor response (plot 1006) of graph 1000 exhibits hot-to-cold slew rate degradation behavior, while the sixth degraded EGT sensor response (plot 906) of graph 900 does not.

Because the fifth degraded EGT sensor response (plot 906 of graph 900) includes the delayed response rate to the cold-to-hot temperature stepwise change and not to the hot-to-cold temperature stepwise change, the EGT sensor of FIG. 9 is characterized as having asymmetric cold-to-hot slew rate degradation. That is, the temperature signal output by the degraded EGT sensor may start to transition from cold-to-hot at a nominal time, but the transition may occur at a lower than expected response rate, which results in a reduced high temperature peak time. This type of behavior may be considered asymmetric because a rate of the response of the EGT sensor is slow (or lower than expected) during the transition from cold-to-hot and not during hot-to-cold. Example graph 900 illustrates this result graphically, as the fifth degraded EGT sensor response (plot 906) is less steep (e.g., has a lower rate of change) than the expected sensor response (plot 504) during the transition from low temperature to high temperature operation.

Because the sixth degraded EGT sensor response (plot 1006 of graph 1000) includes the delayed response rate to the hot-to-cold temperature stepwise change and not to the cold-to-hot temperature stepwise change, the EGT sensor of FIG. 10 is characterized as having asymmetric hot-to-cold slew rate degradation. That is, the temperature signal output by the degraded EGT sensor may start to transition from hot-to-cold at a nominal time, but the transition may occur at a lower than expected response rate, which results in a reduced low temperature peak time. This type of behavior may be considered asymmetric because a rate of the response of the EGT sensor is slow (or lower than expected) during the transition from hot-to-cold and not during cold-to-hot. Example graph 1000 illustrates this result graphically, as the sixth degraded sensor response (1006) is less steep (e.g., has a lower rate of change) than the expected sensor response (plot 504) during the transition from high temperature to low temperature operation.

It may be appreciated that a degraded EGT sensor may exhibit a combination of two or more of the above described degradation behaviors. For example, a degraded EGT sensor may exhibit an asymmetric cold-to-hot slew rate degradation behavior (e.g., as shown in FIG. 9) as well as an asymmetric hot-to-cold delay degradation behavior (e.g., as shown in FIG. 7).

For a more detailed description of the two types of degradation behavior during temperature cycling, FIG. 11 provides an illustrative, non-limiting example plot 1100 of a possible exhaust gas temperature sensor response to a commanded change in temperature. The exhaust gas temperature sensor response shown in FIG. 11 may be the response from exhaust gas temperature sensor 98 of FIG. 2, for example, or another suitable temperature sensor. For plot 1100, the vertical axis shows exhaust gas temperature. The horizontal axis shows time measured in minutes. As shown in plot 1100, a commanded exhaust gas temperature is indicated in dashed plot 1120, and a measured exhaust gas temperature is indicated in plot 1122. The measured exhaust gas temperature may be the temperature value determined by a controller that receives output from the exhaust gas temperature sensor or may be the raw output of the sensor.

Example graph 1100 illustrates the parameters used to calculate an EGT sensor delay and an EGT sensor response rate (e.g., slew rate) during transitions between high temperature and low temperature operations (e.g., cold-to-hot and hot-to-cold transitions). The arrow 1102 illustrates the time delay, which is the time duration from the commanded change in temperature to a time ($\tau 0$) when a threshold change in the measured temperature (or a threshold change in the EGT sensor output) is initially observed. The threshold change in temperature (or threshold change in the EGT sensor output) may be a small change that indicates the response to the commanded change has started, e.g., 5%, 10%, 20%, etc. As one non-limiting example, the expected time delay for an EGT sensor may be 15 seconds. In such an example, line 1102 spans the 15 second duration between the engine entering the high temperature operation and the EGT sensor measuring a change in exhaust gas temperature.

The time delay, indicated by arrow 1102, may be compared to a threshold time delay to determine if the sensor is exhibiting a delay degradation behavior. The threshold time delay may be a predetermined value stored in the controller memory. Alternatively, the threshold time delay may be a factor of one or more engine parameters, and may be calculated based on logic rules stored in controller memory, for example. As another example, the threshold time delay may be determined with the use of one or more look-up tables.

The EGT sensor slew rate measures the rate of change of the sensor response to a stepwise change in exhaust temperature. In example graph 1100, the arrow 1106 indicates the time duration from $\tau 0$ to when, for example, 95% of the desired response is achieved, otherwise referred to as a threshold response time ($\tau 95$). Although this example uses 95% as a threshold response time, other values may be used in other examples. Generally, the slew rate may be determined based on the change in measured temperature over the duration of the response (e.g., during the duration from τ0 to τ95). Further, line 1108 illustrates the change in temperature between τ0 and τ95. The response rate may be the rate of change of the signal response, and can be used to determine if slew rate degradation is present (e.g., the EGT sensor slew rate is degraded relative to threshold slew rate). The threshold slew rate may be a predetermined value stored in the controller memory. Alternatively, the threshold slew rate may be a factor of one or more engine parameters, and may be calculated based on logic rules stored in controller memory, for example. As another example, the threshold slew rate may be determined with the use of one or more look-up tables.

Next, FIG. 12 shows an example timeline 1200 of transitioning an engine between different operating modes responsive to a request for EGT sensor diagnostics. The engine may be engine 10 shown in FIGS. 1-2, for example. The diagnostic request is shown in plot 1201, an engine operating mode (e.g., high temperature, low temperature, or nominal stoichiometric operation) is shown in plot 1202, engine torque is shown in plot 1203, a spark timing of the first set of cylinders is shown in dashed plot 1204, a spark timing of the second set of cylinders is shown in plot 1205, an exhaust temperature measured by the EGT sensor is shown in plot 1206, an expected measured exhaust temperature while performing the EGT sensor diagnostic is shown in plot 1207, and an indication of EGT sensor degradation is shown in plot 1208. Further, MBT spark timing is shown by a dashed line 1209, an upper exhaust temperature threshold for performing the EGT diagnostic is shown by a dashed line 1210, and a lower exhaust temperature threshold for performing the EGT diagnostic is shown by a dashed line 1212. Note that while MBT spark timing is shown as a flat line, an absolute spark timing of MBT may vary based on engine operating conditions, such as engine speed and load, for example.

For all of the above, the horizontal axis represents time, with time increasing along the horizontal axis from left to right. The vertical axis represents each labeled parameter. For plots 1203, 1204, 1205, 1206, and 1207, a magnitude of the parameter increases up the vertical axis from bottom to top. For plot 1201, the vertical axis shows whether an EGT diagnostic test is requested (e.g., "yes" or "no"). For plot 1202, the vertical axis shows whether the engine is operating in the nominal stoichiometric mode with nominal spark timing ("stoich"), a high temperature operating mode ("high T"), or a low temperature operating mode ("low T"), as labeled. For plot 1208, the vertical axis shows an indication of EGT sensor degradation, including no degradation ("none"), symmetric delay degradation ("sym delay"), asymmetric delay degradation ("asym delay"), symmetric slew rate degradation ("sym rate"), and asymmetric slew rate degradation ("asym rate"). Further, spark timings for two cylinder sets are shown, corresponding to an engine having an even number of cylinders (e.g., as in engine system 200 of FIG. 2). That is, all of the engine cylinders are divided equally between the first set and the second set. Further still, the example timeline 1200 of FIG. 12 will be described for an engine with four or more cylinders, although in other examples, similar adjustments may be applied in an engine having two cylinders.

Prior to time t1, the engine is operated in the stoichiometric mode (plot 1202), with all of the engine cylinders uniformly operating with an AFR of stoichiometry and a spark timing slightly retarded from MBT for both the first set of cylinders (dashed plot 1205, which overlaps with solid plot 1204) and the second set of cylinders (plot 1204). The engine torque (plot 1203) is relatively constant, indicating that the engine is operating at steady state. Further, the measured exhaust temperature (plot 1206) is between the upper threshold temperature (dashed line 1210) and the lower threshold temperature (dashed line 1212), indicating that the exhaust gas temperature is in a calibrated range for performing the EGT sensor diagnostic. Therefore, at time t1, the conditions for the EGT sensor diagnostic are met, resulting in a request for the EGT sensor diagnostic activating (plot 1201).

Responsive to the EGT sensor diagnostic request (plot 1201) at time t1, the engine is transitioned into the high temperature operating mode (plot 1202) to monitor the EGT sensor response (e.g., the measured exhaust temperature in plot 1206) to stepwise changes in exhaust gas temperature, relative to the expected EGT sensor response (e.g., the expected measured exhaust temperature in plot 1207). To transition the engine into the high temperature operating mode, the engine continues to operate at stoichiometry, while spark is retarded between time t1 and time t2. As discussed above with respect to FIG. 3, operating the engine with the spark timing retarded increases the exhaust temperature. Further, the engine torque is held relatively constant (plot 1203) due to increasing a throttle position during the transition to compensate for the reduced torque output caused by spark retard. As a result of transitioning to the high temperature operating mode, the measured exhaust gas temperature increases (plot 1206).

At time t2, the engine transitions from the high temperature operating mode to the low temperature operating mode to monitor the EGT sensor response to the stepwise change from the high to low temperature operation relative to the expected EGT sensor response. To transition the engine into the low temperature operating mode, the engine is transitioned into split lambda operation between time t2 and time t3 while still maintaining global stoichiometric operation. That is, a degree of enrichment of the first set of cylinders is increased at the same rate as a degree of enleanment of the second set of cylinders. As elaborated above with respect to FIG. 3, the split lambda operation increases a torque produced by the rich cylinders (e.g., the first cylinder set) while decreasing a torque produced by the lean cylinder (e.g., the second cylinder set), which is offset by different spark timing adjustments to the different cylinder sets. For example, the spark timing of the rich cylinder set (dashed plot 1204) is further retarded than the spark timing of the lean cylinder set (plot 1205), and both are further advanced than the spark timing during the high temperature operating mode (e.g., between time t1 and time t2), in order to maintain a consistent engine torque (plot 1203). In this way, torque remains balanced between the high temperature operation and the low temperature operation.

While operating in the low temperature mode between time t2 and time t3, the exhaust temperature decreases relative to stoichiometric operation and relative to the high temperature operating mode due to cooling effects of both the split lambda fueling and the spark advancement. For example, as described above with respect to FIG. 3, unburnt fuel in the first set of cylinders absorbs heat from combustion to reduce the exhaust temperature. Further, the measured exhaust temperature (plot 1206) does not deviate from the expected EGT sensor response (plot 1207), without showing any delay or slew rate degradation.

To gather a desired number of data samples for characterizing the EGT sensor response, the engine continues to cycle between high temperature and low temperature operation. Specifically, between time t3 and time t4, the engine transitions from the low temperature operation to the high temperature operation. All of the cylinders are transitioned back to operating with a uniform, stoichiometric commanded AFR and a uniform retarded spark timing, resulting in an increased measured exhaust temperature (plot 1206) while the engine torque is maintained 1203. The measured exhaust temperature (plot 1206) continues to match the expected EGT sensor response (plot 1207), without delay or slew rate degradation. Then, between time t4 and time t5, the engine again transitions from the high temperature operation to the low temperature operation. That is, the engine is transitioned to split lambda fueling, with the first cylinder set operating with a rich commanded AFR and the second cylinder set operating with a lean commanded AFR, and with the spark timing differentially adjusted in the rich and lean cylinder sets (plots 1204 and 1205, respectively) in order to reduced engine torque fluctuations (plot 1203). As a result of the low temperature operation, the measured exhaust temperature again decreases (plot 1206) and remains consistent with the expected measured exhaust temperature (dashed plot 1207).

At time t5, the EGT sensor diagnostic ends. As such, the EGT sensor diagnostic request is no longer active (plot 1201). In response to the EGT sensor diagnostics request ending, the engine transitions out of the low temperature operation and returns to the stoichiometric operating mode with nominal spark timing (plot 1202). Although the EGT sensor diagnostic included three stepwise changes in exhaust temperature (e.g., hot-to-cold, cold-to-hot, and hot-to-cold) in this example, in other examples, the EGT sensor diagnostic may include a different, non-zero number of stepwise changes in exhaust temperature based on engine settings and engine operating parameters. Because the measured exhaust temperature (plot 1206) matched the expected measured exhaust temperature (dashed plot 1207) throughout the EGT sensor diagnostic, no EGT sensor degradation is indicated (plot 1208).

As illustrated by a break in the time axis, an unspecified duration of time passes between time t5 and time t6. At time t6, a new EGT sensor diagnostic request (plot 1201) is received. For example, the engine torque is relatively constant (plot 1203) and the measured exhaust temperature (plot 1206) is between the upper threshold temperature (dashed line 1210) and the lower threshold temperature (dashed line 1212), indicating that EGT sensor diagnostic conditions are met. Responsive to the EGT sensor diagnostic request at time t6, the engine transitions into the high temperature operating mode, following the same sequence outlined between time t1 and time t2. However, the EGT sensor response (e.g., the measured temperature plot 1206) is delayed relative to the expected EGT sensor response (e.g., the expected measured temperature plot 1207) (e.g., there is a time delay before the temperature measured by the EGT sensor increases).

At time t7, the engine transitions from the high temperature operation to the low temperature operation (plot 1202), such as described above between time t2 and time t3. During the high temperature to low temperature transition, the EGT sensor response (e.g., the measured temperature plot 1206) conforms to the expected EGT sensor response (e.g., the expected measured temperature plot 1207). As such, the EGT sensor does exhibits delay behavior during the hot-to-cold transition.

At time t8, the engine is again transitioned from the low temperature operating mode to the high temperature operating mode, as indicated by plot 1202. Again, the exhaust temperature increase measured by the EGT sensor (plot 1206) is delayed relative to the expected exhaust temperature increase from the stepwise change (dashed plot 1207), shifting plot 1206 to the right relative to plot 1207 during the cold-to-hot transition.

At time t9, the engine is again transitioned from the high temperature operating mode to the low temperature operating mode (plot 1202). For example, the engine is transitioned into operating with a rich AFR and first spark timing (plot 1204) in the first set of cylinders and a correspondingly lean AFR and a second spark timing (plot 1205) that is less retarded than the first spark timing in the second set of cylinders, thereby maintaining the engine torque (plot 1203) while decreasing the exhaust temperature. During this hot-to-cold transition, the measured exhaust temperature received from the EGT sensor (plot 1206) again does not deviate from the expected exhaust temperature change (dashed plot 1207).

At t10, the EGT sensor diagnostic ends. As such, the EGT sensor diagnostic request (plot 1201) is no longer active. In response to the EGT sensor diagnostics request ending, the engine transitions out of the low temperature operation into stoichiometric operation with nominal spark timing (plot 1202). Due to the delay in the measured exhaust temperature during the diagnostic, asymmetric delay degradation is indicated (plot 1208). Further, the asymmetric delay degradation may be further characterized as cold-to-hot delay degradation. After characterizing the asymmetric delay degradation during the EGT sensor diagnostic procedure, an engine controller may adjust fueling and ignition timing parameters to address the detected EGT sensor degradation.

In this way, an engine may cycle between high temperature operation and low temperature operations, providing stepwise changes in temperature for EGT sensor diagnostics, all while maintaining constant engine torque. For example, high temperature operation may be achieved through a combination of stoichiometric fueling and retarded spark timing. As another example, low temperature operation may be achieved through a combination of a split lambda fueling strategy and advanced spark timing. As a result, the engine controller may observe the EGT sensor response to stepwise changes in exhaust temperature while maintaining constant engine torque, thus providing a non-intrusive diagnostic method for the EGT sensor and improving closed-loop control of exhaust temperature, for example. The EGT sensor characterization may increase an accuracy of the engine operation, which may increase fuel efficiency and decrease emissions relative to engine systems with undiagnosed EGT sensor degradation.

The technical effect of cycling between stoichiometric operation with retarded spark timing and split lambda operation with further advanced spark timing, a degree of the advancement different for enriched and enleaned cylinders, is that stepwise changes in exhaust gas temperature may be produced for characterizing an exhaust gas temperature sensor response while engine torque is maintained relatively constant.

In one example, a method comprises: cycling an engine between a high temperature operating mode and a low temperature operating mode while maintaining engine torque between the high temperature operating mode and the low temperature operating mode, both the high temperature operating mode and the low temperature operating mode producing stoichiometric exhaust gas at a catalyst; and characterizing a response behavior of an exhaust gas temperature (EGT) sensor based on output of the EGT sensor during the cycling. In the preceding example, additionally or optionally, cycling the engine between the high temperature operating mode and the low temperature operating mode includes transitioning the engine from the high temperature operating mode to the low temperature operating mode and transitioning the engine from the low temperature operating mode to the high temperature operating mode at a determined frequency and for a determined number of transitions between the high temperature operating mode and the low temperature operating mode. In one or both of the preceding examples, additionally or optionally, the response behavior includes at least one of asymmetric delay degradation behavior, symmetric delay degradation behavior, asymmetric slew rate degradation behavior, symmetric slew rate degradation behavior, and no degradation behavior. In any or all of the preceding examples, additionally or optionally, characterizing the response behavior of the EGT sensor based on the output of the EGT sensor during the cycling includes: determining a first time delay between transitioning the engine from the high temperature operating mode to the low temperature operating mode and the output of the EGT sensor decreasing; determining a first slew rate based on a change in the output of the EGT sensor over time after transitioning the engine from the high temperature operating mode to the low temperature operating mode; determining a second time delay between transitioning the engine from the low temperature operating mode to the high temperature operating mode and the output of the EGT sensor increasing; and determining a second slew rate based on the change in the output of the EGT sensor over time after transitioning the engine from the low temperature operating mode to the high temperature operating mode. In any or all of the preceding examples, additionally or optionally, characterizing the response behavior of the EGT sensor based on the output of the EGT sensor during the cycling further includes: indicating the asymmetric delay degradation behavior responsive to one of the first time delay and the second time delay being greater than a first threshold; indicating symmetric delay degradation behavior responsive to both of the first time delay and the second time delay being greater than the first threshold; indicating asymmetric slew rate degradation behavior responsive to one of the first slew rate the second slew rate being less than a second threshold; indicating symmetric slew rate degradation behavior responsive to both of the first response rate and the second response rate being less than the second threshold; and indicating no degradation behavior responsive to all of the first time delay being less than the first threshold, the second time delay being less than the first threshold, the first response rate being greater than the second threshold, and the second response rate being greater than the second threshold. In any or all of the preceding examples, additionally or optionally, the high temperature operating mode includes operating every cylinder of the engine with stoichiometric fueling and a same first retarded spark timing, and the low temperature operating mode includes operating a first half of the cylinders with rich fueling and a second retarded spark timing, the second retarded spark timing less retarded than the first retarded spark timing, and a second half of the cylinders with lean fueling and a third retarded spark timing, the third retarded spark timing less retarded than the second retarded spark timing.

As another example, a method comprises: diagnosing an exhaust gas temperature (EGT) sensor based on output of the EGT sensor received while differently modulating a first commanded air-fuel ratio (AFR) and a first spark timing in a first number of engine cylinders and a second commanded AFR and a second spark timing in a second number of engine cylinders, torque output and stoichiometric exhaust gas maintained during the modulating. In the preceding example, additionally or optionally, differently modulating the first commanded AFR and the first spark timing in the first number of engine cylinders and the second commanded AFR and the second spark timing in the second number of engine cylinders transitions the engine between a higher temperature operating mode and a lower temperature operating mode. In one or both of the preceding examples, additionally or optionally, the higher temperature operating mode includes operating with both the first commanded AFR and the second commanded AFR set at stoichiometry and both the first spark timing and the second spark timing set at a first retarded spark timing, and differently modulating the first commanded AFR and the first spark timing in the first number of engine cylinders and the second commanded AFR and the second spark timing in the second number of engine cylinders includes: adjusting the first commanded AFR from stoichiometry to a rich AFR and the first spark timing from the first retarded spark timing to a second retarded spark timing that is less retarded than the first retarded spark timing; and adjusting the second commanded AFR from stoichiometry to a lean AFR and the second spark timing to a third retarded spark timing that is less retarded than the second retarded spark timing. In any or all of the preceding examples, additionally or optionally, the first number of engine cylinders includes a first half of a total number of cylinders in the engine and the second number of engine cylinders includes a second half of the total number of cylinders in the engine, and a degree of enrichment of the rich AFR is equal to a degree of enleanment of the lean AFR. In any or all of the preceding examples, additionally or optionally, the lower temperature operating mode includes operating with the first commanded AFR set at the rich AFR, the second commanded AFR set at the lean AFR, the first spark timing set at the second retarded spark timing, and the second spark timing set at the third retarded spark timing, and differently modulating the first commanded AFR and the first spark timing in the first number of engine cylinders and the second commanded AFR and the second spark timing in the second number of engine cylinders further includes: adjusting the first commanded AFR from the rich AFR to stoichiometry and the first spark timing from the second retarded spark timing to the first retarded spark timing; and adjusting the second commanded AFR from the lean AFR to stoichiometry and the second spark timing to the first retarded spark timing. In any or all of the preceding examples, additionally or optionally, diagnosing the EGT sensor based on the output of the EGT sensor received while differently modulating the first commanded AFR and the first spark timing in the first number of engine cylinders and the second commanded AFR and the second spark timing in the second number of engine cylinders includes: determining a first response delay and a first slew rate based on an increase in the output following transitioning from the higher temperature operating mode to the lower temperature operating mode; and determining a second response delay and a second slew rate based on a decrease in the output following transitioning from the lower temperature operating mode to the higher temperature operating mode. In any or all of the preceding examples, additionally or optionally, the first response delay includes a first time duration between transitioning from the higher temperature operating mode to the lower temperature operating mode and the output of the EGT sensor decreasing by a threshold amount; the first slew rate includes a first change in the output of the EGT sensor over a first threshold response time beginning immediately after the first response delay; the second response delay includes a second time duration between transitioning from the lower temperature operating mode to the higher temperature operating mode and the output of the EGT sensor increasing by the threshold amount; and the second slew rate includes a second change in the output of the EGT sensor over a second threshold response time beginning immediately after the second response delay. In any or all of the preceding examples, additionally or optionally, diagnosing the EGT sensor based on the output of the EGT sensor received while differently modulating the first commanded AFR and the first spark timing in the first number of engine cylinders and the second commanded AFR and the second spark timing in the second number of engine cylinders further includes: indicating the asymmetric delay degradation responsive to one of the first response delay and the second response delay being greater than a threshold delay; indicating symmetric delay degradation responsive to both of the first response delay and the second response delay being greater than the threshold delay; indicating asymmetric slew rate degradation responsive to one of the first slew rate the second slew rate being less than a threshold rate; indicating symmetric slew rate degradation responsive to both of the first response rate and the second response rate being less than the threshold rate; and indicating no degradation responsive to all of the first response delay being less than the threshold delay, the second response delay being less than the threshold delay, the first slew rate being greater than the threshold rate, and the second slew rate being greater than the threshold rate.

As another example, a system comprises: a spark ignition engine including a plurality of cylinders; an exhaust gas temperature (EGT) sensor coupled to an exhaust passage of the engine; and a controller with computer readable instructions stored in non-transitory memory that, when executed during engine operation, cause the controller to: determine whether the EGT sensor is degraded by monitoring an exhaust gas temperature measured by the EGT sensor while adjusting engine operation to produce stepwise changes in the exhaust gas temperature while maintaining torque output of the engine and an overall air-fuel ratio of the exhaust gas between the stepwise changes. In the preceding example, additionally or optionally, the overall air-fuel ratio of the exhaust gas is stoichiometry, and to adjust the engine operation to produce the stepwise changes in the exhaust gas temperature, the controller includes further instructions stored in non-transitory memory that, when executed, cause the controller to: alternate between operating the engine with stoichiometric fueling and a uniform spark timing and operating the engine with split lambda fueling and a non-uniform spark timing that is less retarded than the uniform spark timing, the operating the engine with the stoichiometric fueling and the uniform spark timing producing a higher exhaust gas temperature than the operating the engine with split lambda fueling and the non-uniform spark timing. In one or both of the preceding examples, additionally or optionally, to operate the engine with the split lambda fueling and the non-uniform spark timing, the controller includes further instructions stored in non-transitory memory that, when executed, cause the controller to: operate a first half of the plurality of cylinders at a rich air-fuel ratio and a first spark timing that is less retarded than the uniform spark timing; and operate a second half of the plurality of cylinders at a lean air-fuel ratio and a second spark timing that is less retarded than both of the uniform spark timing and the first spark timing, a degree of enleanment of the lean air-fuel ratio equal to a degree of enrichment of the rich air-fuel ratio, the first spark timing and the second spark timing each selected to produce a same torque output as the stoichiometric fueling and the uniform spark timing. In any or all of the preceding examples, additionally or optionally, to determine whether the EGT sensor is degraded, the controller includes further instructions stored in non-transitory memory that, when executed, cause the controller to: indicate the EGT sensor is degraded responsive to at least one of a response delay greater than a first threshold and a slew rate less than a second threshold during the stepwise changes in the exhaust gas temperature; and indicate the EGT sensor is not degraded responsive to the response delay being less than the first threshold and the slew rate magnitude being greater than the second threshold during the stepwise changes in the exhaust gas temperature. In any or all of the preceding examples, additionally or optionally, the response delay includes a time delay between transitioning from operating the engine with stoichiometric fueling and the uniform spark timing to operating the engine with split lambda fueling and the non-uniform spark timing and the exhaust gas temperature measured by the EGT sensor decreasing, and the slew rate includes a change in the exhaust gas temperature measured by the EGT sensor over time caused by transitioning from operating the engine with stoichiometric fueling and the uniform spark timing to operating the engine with split lambda fueling and the non-uniform spark timing. In any or all of the preceding examples, additionally or optionally, the response delay includes a time delay between transitioning from operating the engine with split lambda fueling and the non-uniform spark timing to operating the engine with stoichiometric fueling and the uniform spark timing and the exhaust gas temperature measured by the EGT sensor increasing, and the slew rate includes a change in the exhaust gas temperature measured by the EGT sensor over time caused by transitioning from operating the engine with split lambda fueling and the non-uniform spark timing to operating the engine with stoichiometric fueling and the uniform spark timing.

In another representation, a method comprises: characterizing a response of an exhaust gas temperature (EGT) sensor while alternating between a high temperature engine operating mode and a low temperature engine operating mode without varying engine torque output and exhaust gas air-fuel ratio (AFR). In the preceding example, additionally or optionally, characterizing the response behavior of the EGT sensor includes identifying at least one of asymmetric delay degradation behavior, symmetric delay degradation behavior, asymmetric slew rate degradation behavior, symmetric slew rate degradation behavior, and no degradation behavior. In one or both of the preceding examples, additionally or optionally, the high temperature engine operating mode includes operating with stoichiometric fueling and a uniform spark timing, and the low temperature operating mode includes operating with split lambda fueling and a non-uniform spark timing. In any or all of the preceding examples, additionally or optionally, the uniform spark timing is more retarded than the non-uniform spark timing. In any or all of the preceding examples, additionally or optionally, operating with the split lambda fueling and the non-uniform spark timing includes operating a first subset of engine cylinders at a rich AFR and a first spark timing that is less retarded than the uniform spark timing and operating a second subset of engine cylinders at a lean AFR and a second spark timing that is less retarded than the first spark timing. In any or all of the preceding examples, additionally or optionally, the first spark timing is selected based on the rich AFR and a torque output produced by the stoichiometric fueling and the uniform spark timing, and the second spark timing is selected based on the lean AFR and the torque output produced by the stoichiometric fueling and the uniform spark timing. In any or all of the preceding examples, additionally or optionally, a number of engine cylinders in the first subset of engine cylinders is equal to a number of engine cylinders in the second subset of engine cylinders, and the rich AFR and the lean AFR average to stoichiometry.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
cycling an engine between a high temperature operating mode and a low temperature operating mode while maintaining engine torque between the high temperature operating mode and the low temperature operating mode, both the high temperature operating mode and the low temperature operating mode producing stoichiometric exhaust gas at a catalyst; and
characterizing a response behavior of an exhaust gas temperature (EGT) sensor based on output of the EGT sensor during the cycling.

2. The method of claim 1, wherein cycling the engine between the high temperature operating mode and the low temperature operating mode includes transitioning the engine from the high temperature operating mode to the low temperature operating mode and transitioning the engine from the low temperature operating mode to the high temperature operating mode at a determined frequency and for a determined number of transitions between the high temperature operating mode and the low temperature operating mode.

3. The method of claim 2, wherein the response behavior includes at least one of asymmetric delay degradation behavior, symmetric delay degradation behavior, asymmetric slew rate degradation behavior, symmetric slew rate degradation behavior, and no degradation behavior.

4. The method of claim 3, wherein characterizing the response behavior of the EGT sensor based on the output of the EGT sensor during the cycling includes:
determining a first time delay between transitioning the engine from the high temperature operating mode to the low temperature operating mode and the output of the EGT sensor decreasing;
determining a first slew rate based on a change in the output of the EGT sensor over time after transitioning the engine from the high temperature operating mode to the low temperature operating mode;
determining a second time delay between transitioning the engine from the low temperature operating mode to the high temperature operating mode and the output of the EGT sensor increasing; and
determining a second slew rate based on the change in the output of the EGT sensor over time after transitioning the engine from the low temperature operating mode to the high temperature operating mode.

5. The method of claim 4, wherein characterizing the response behavior of the EGT sensor based on the output of the EGT sensor during the cycling further includes:
indicating the asymmetric delay degradation behavior responsive to one of the first time delay and the second time delay being greater than a first threshold;
indicating symmetric delay degradation behavior responsive to both of the first time delay and the second time delay being greater than the first threshold;
indicating asymmetric slew rate degradation behavior responsive to one of the first slew rate the second slew rate being less than a second threshold;
indicating symmetric slew rate degradation behavior responsive to both of the first response rate and the second response rate being less than the second threshold; and
indicating no degradation behavior responsive to all of the first time delay being less than the first threshold, the second time delay being less than the first threshold, the first response rate being greater than the second threshold, and the second response rate being greater than the second threshold.

6. The method of claim 1, wherein the high temperature operating mode includes operating every cylinder of the engine with stoichiometric fueling and a same first retarded spark timing, and the low temperature operating mode includes operating a first half of the cylinders with rich fueling and a second retarded spark timing, the second retarded spark timing less retarded than the first retarded spark timing, and a second half of the cylinders with lean fueling and a third retarded spark timing, the third retarded spark timing less retarded than the second retarded spark timing.

7. A method, comprising:
diagnosing an exhaust gas temperature (EGT) sensor based on output of the EGT sensor received while differently modulating a first commanded air-fuel ratio (AFR) and a first spark timing in a first number of engine cylinders and a second commanded AFR and a second spark timing in a second number of engine cylinders, torque output and stoichiometric exhaust gas maintained during the modulating.

8. The method of claim 7, wherein differently modulating the first commanded AFR and the first spark timing in the first number of engine cylinders and the second commanded AFR and the second spark timing in the second number of engine cylinders transitions the engine between a higher temperature operating mode and a lower temperature operating mode.

9. The method of claim 8, wherein the higher temperature operating mode includes operating with both the first commanded AFR and the second commanded AFR set at stoichiometry and both the first spark timing and the second spark timing set at a first retarded spark timing, and differently modulating the first commanded AFR and the first spark timing in the first number of engine cylinders and the second commanded AFR and the second spark timing in the second number of engine cylinders includes:
adjusting the first commanded AFR from stoichiometry to a rich AFR and the first spark timing from the first retarded spark timing to a second retarded spark timing that is less retarded than the first retarded spark timing; and
adjusting the second commanded AFR from stoichiometry to a lean AFR and the second spark timing to a third retarded spark timing that is less retarded than the second retarded spark timing.

10. The method of claim 9, wherein the first number of engine cylinders includes a first half of a total number of cylinders in the engine and the second number of engine cylinders includes a second half of the total number of cylinders in the engine, and a degree of enrichment of the rich AFR is equal to a degree of enleanment of the lean AFR.

11. The method of claim 9, wherein the lower temperature operating mode includes operating with the first commanded AFR set at the rich AFR, the second commanded AFR set at the lean AFR, the first spark timing set at the second retarded spark timing, and the second spark timing set at the third retarded spark timing, and differently modulating the first commanded AFR and the first spark timing in the first number of engine cylinders and the second commanded AFR and the second spark timing in the second number of engine cylinders further includes:
adjusting the first commanded AFR from the rich AFR to stoichiometry and the first spark timing from the second retarded spark timing to the first retarded spark timing; and
adjusting the second commanded AFR from the lean AFR to stoichiometry and the second spark timing to the first retarded spark timing.

12. The method of claim 8, wherein diagnosing the EGT sensor based on the output of the EGT sensor received while differently modulating the first commanded AFR and the first spark timing in the first number of engine cylinders and the second commanded AFR and the second spark timing in the second number of engine cylinders includes:
determining a first response delay and a first slew rate based on an increase in the output following transitioning from the higher temperature operating mode to the lower temperature operating mode; and
determining a second response delay and a second slew rate based on a decrease in the output following transitioning from the lower temperature operating mode to the higher temperature operating mode.

13. The method of claim 12, wherein:
the first response delay includes a first time duration between transitioning from the higher temperature operating mode to the lower temperature operating mode and the output of the EGT sensor decreasing by a threshold amount;
the first slew rate includes a first change in the output of the EGT sensor over a first threshold response time beginning immediately after the first response delay;
the second response delay includes a second time duration between transitioning from the lower temperature operating mode to the higher temperature operating mode and the output of the EGT sensor increasing by the threshold amount; and
the second slew rate includes a second change in the output of the EGT sensor over a second threshold response time beginning immediately after the second response delay.

14. The method of claim 13, wherein diagnosing the EGT sensor based on the output of the EGT sensor received while differently modulating the first commanded AFR and the first spark timing in the first number of engine cylinders and the second commanded AFR and the second spark timing in the second number of engine cylinders further includes:
indicating the asymmetric delay degradation responsive to one of the first response delay and the second response delay being greater than a threshold delay;
indicating symmetric delay degradation responsive to both of the first response delay and the second response delay being greater than the threshold delay;
indicating asymmetric slew rate degradation responsive to one of the first slew rate the second slew rate being less than a threshold rate;
indicating symmetric slew rate degradation responsive to both of the first response rate and the second response rate being less than the threshold rate; and
indicating no degradation responsive to all of the first response delay being less than the threshold delay, the second response delay being less than the threshold delay, the first slew rate being greater than the threshold rate, and the second slew rate being greater than the threshold rate.

15. A system, comprising:
a spark ignition engine including a plurality of cylinders;
an exhaust gas temperature (EGT) sensor coupled to an exhaust passage of the engine; and
a controller with computer readable instructions stored in non-transitory memory that, when executed during engine operation, cause the controller to:
determine whether the EGT sensor is degraded by monitoring an exhaust gas temperature measured by the EGT sensor while adjusting engine operation to produce stepwise changes in the exhaust gas temperature while maintaining torque output of the engine and an overall air-fuel ratio of the exhaust gas between the stepwise changes.

16. The system of claim 15, wherein the overall air-fuel ratio of the exhaust gas is stoichiometry, and to adjust the engine operation to produce the stepwise changes in the exhaust gas temperature, the controller includes further instructions stored in non-transitory memory that, when executed, cause the controller to:
  alternate between operating the engine with stoichiometric fueling and a uniform spark timing and operating the engine with split lambda fueling and a non-uniform spark timing that is less retarded than the uniform spark timing, the operating the engine with the stoichiometric fueling and the uniform spark timing producing a higher exhaust gas temperature than the operating the engine with split lambda fueling and the non-uniform spark timing.

17. The system of claim 16, wherein to operate the engine with the split lambda fueling and the non-uniform spark timing, the controller includes further instructions stored in non-transitory memory that, when executed, cause the controller to:
  operate a first half of the plurality of cylinders at a rich air-fuel ratio and a first spark timing that is less retarded than the uniform spark timing; and
  operate a second half of the plurality of cylinders at a lean air-fuel ratio and a second spark timing that is less retarded than both of the uniform spark timing and the first spark timing, a degree of enleanment of the lean air-fuel ratio equal to a degree of enrichment of the rich air-fuel ratio, the first spark timing and the second spark timing each selected to produce a same torque output as the stoichiometric fueling and the uniform spark timing.

18. The system of claim 16, wherein to determine whether the EGT sensor is degraded, the controller includes further instructions stored in non-transitory memory that, when executed, cause the controller to:
  indicate the EGT sensor is degraded responsive to at least one of a response delay greater than a first threshold and a slew rate less than a second threshold during the stepwise changes in the exhaust gas temperature; and
  indicate the EGT sensor is not degraded responsive to the response delay being less than the first threshold and the slew rate magnitude being greater than the second threshold during the stepwise changes in the exhaust gas temperature.

19. The system of claim 18, wherein the response delay includes a time delay between transitioning from operating the engine with stoichiometric fueling and the uniform spark timing to operating the engine with split lambda fueling and the non-uniform spark timing and the exhaust gas temperature measured by the EGT sensor decreasing, and the slew rate includes a change in the exhaust gas temperature measured by the EGT sensor over time caused by transitioning from operating the engine with stoichiometric fueling and the uniform spark timing to operating the engine with split lambda fueling and the non-uniform spark timing.

20. The system of claim 18, wherein the response delay includes a time delay between transitioning from operating the engine with split lambda fueling and the non-uniform spark timing to operating the engine with stoichiometric fueling and the uniform spark timing and the exhaust gas temperature measured by the EGT sensor increasing, and the slew rate includes a change in the exhaust gas temperature measured by the EGT sensor over time caused by transitioning from operating the engine with split lambda fueling and the non-uniform spark timing to operating the engine with stoichiometric fueling and the uniform spark timing.

* * * * *